(12) United States Patent
Lange et al.

(10) Patent No.: US 6,385,134 B1
(45) Date of Patent: *May 7, 2002

(54) WATCH

(75) Inventors: Jürgen Lange, Schaffhausen; Richard Habring, Dissenhofen; Kurt Klaus, Schaffhausen, all of (CH); Ferdinand Speichinger, Jestetten (DE)

(73) Assignee: IWC International Watch Co. AG, Schaffhausen (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,694

(22) Filed: Mar. 8, 1999

(30) Foreign Application Priority Data

Mar. 13, 1998 (DE) .......................... 198 10 915
Mar. 5, 1999 (DE) .......................... 199 09 623

(51) Int. Cl.[7] .................. G04B 47/06; G01F 23/00; G01L 7/04
(52) U.S. Cl. .................. 368/11; 73/291; 73/299; 73/732; 73/741
(58) Field of Search .................. 368/10, 11; 73/290 R, 73/291, 300, 432, 384–387, 732–746

(56) References Cited

U.S. PATENT DOCUMENTS

| 3,196,688 | A | * | 7/1965 | Smith |
| 3,653,203 | A | * | 4/1972 | Hurt |
| 3,675,487 | A | * | 7/1972 | Mueller ........................ 73/414 |
| 3,696,610 | A | | 10/1972 | Charbonnier |
| 3,869,916 | A | * | 3/1975 | Ojima ........................ 73/300 |
| 4,080,781 | A | | 3/1978 | Klingenberg |
| 4,444,057 | A | * | 4/1984 | Letterhorn .................... 73/739 |
| 5,251,190 | A | * | 10/1993 | Miyasaka et al. ............. 368/10 |
| 5,303,587 | A | * | 4/1994 | Garraffa et al. ............... 73/300 |

FOREIGN PATENT DOCUMENTS

| CH | 508926 | 6/1971 |
| CH | 568608 | 10/1975 |
| CH | 592329 | 10/1977 |
| DE | 3009624 | 9/1981 |
| DE | 69300982 | 8/1993 |

* cited by examiner

*Primary Examiner*—Vit Miska
(74) *Attorney, Agent, or Firm*—Martin A. Farber

(57) ABSTRACT

A watch, in particular a dive watch, having a movement (16) which is arranged in a watch case (12) and can be used to drive an hour hand (3) via an hour tube and a minute hand (4) via a minute tube in a fashion sweeping over a dial (1). Also present is a pressure detecting device for detecting the ambient pressure outside the watch case (12) and a display for representing the detected pressure values. There is arranged in the watch case (12) a mechanical pressure transducer to which the ambient pressure outside the watch case (12) can be applied and by means of which a mechanical depth measurement mechanism (17) of a mechanical display can be driven.

57 Claims, 18 Drawing Sheets

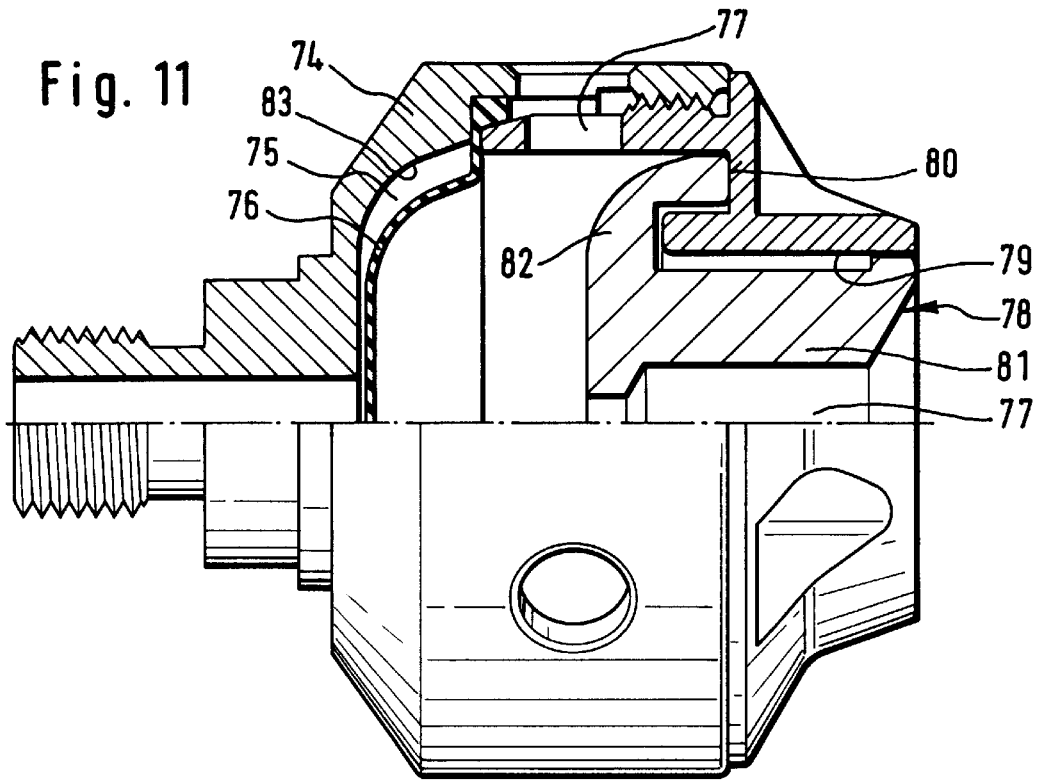
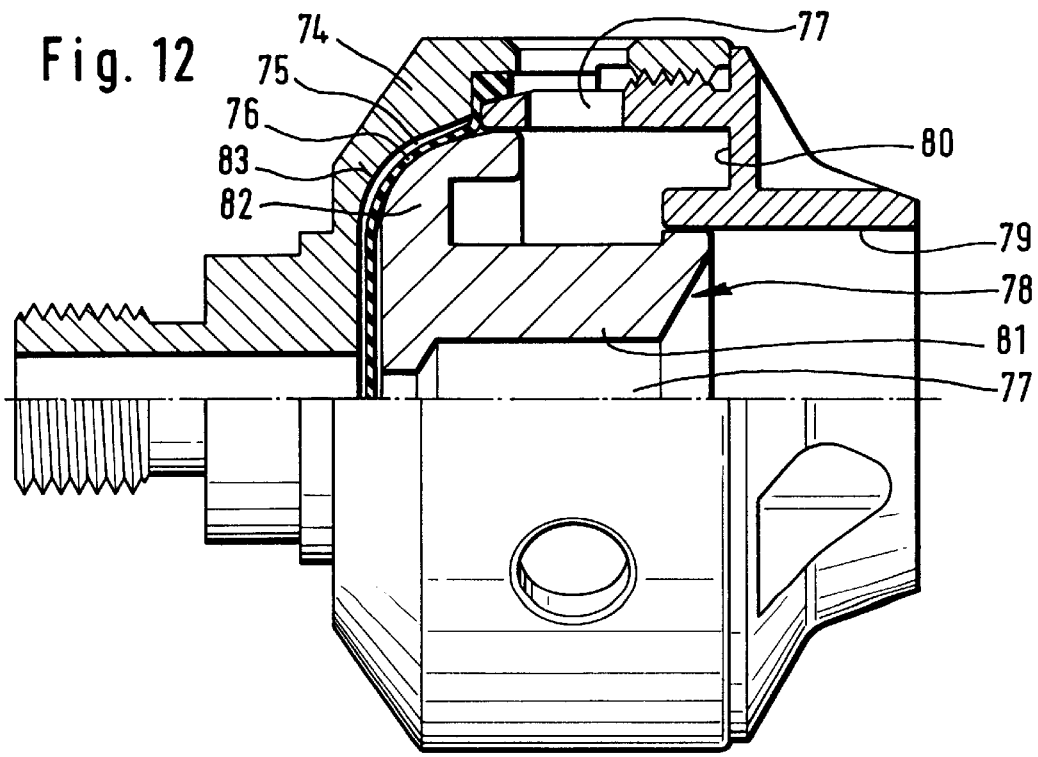

WATCH

FIELD AND BACKGROUND OF THE INVENTION

The invention relates to a watch, in particular a dive watch, having a movement which is arranged in a watch case and can be used to drive an hour hand via an hour tube, and a minute hand and, if appropriate, a second hand via a minute tube in a fashion sweeping over a dial, as well as having a pressure detecting device for detecting the ambient pressure outside the watch case and a display for representing the detected pressure values.

It is known in dive watches to detect the ambient pressure by means of electric or electronic sensors and to convert it in an electronic evaluation device into signals for driving a dive depth display. Both the detection and the representation of the ambient pressures require a battery as power supply. If the battery performance drops, the dangerous situation arises for the diver that the sensors and the display can still function to a certain extent, with the result that the user assumes he has a fully functional dive watch. However, because of the no longer adequate power supply both the values detected and the values displayed are incorrect.

It is possible thereby for situations which endanger the diver's health or even life-threatening situations to occur, for example due to diving deeper than intended or ascending more rapidly than permissible.

FIELD AND BACKGROUND OF THE INVENTION

It is therefore the object of the invention to create a watch of the type mentioned at the beginning in which these disadvantages of known watches are avoided.

This object is achieved according to the invention there is arranged in the watch case a mechanical pressure transducer to which the ambient pressure outside the watch case can be applied and by means of which a mechanical depth measurement mechanism of a mechanical display can be driven. Since none of the watch components for displaying the dive depth depends on a supply of electric or mechanical power, all the disadvantages based on reduction in power and power loss are avoided. The depth display of the watch is completely autonomous and thus always operational and fully functional.

In a simple design, the mechanical depth measurement mechanism can have a display shaft which can be rotatably driven by the pressure transducer and carries a depth hand which can sweep over a depth scale.

A low overall size is achieved by virtue of the fact that the display shaft is arranged coaxially with the hour tube and minute tube, and the depth scale is arranged on the dial.

If the scale division of the depth scale corresponds to the scale division of the minute scale, the display on the depth scale can be taken in just as quickly and easily as is already usual from habit in the case of minute scales on analog watches.

A further contribution to reducing the overall size results when the display shaft projects coaxially through the hour and minute tubes and, if appropriate, the second tube.

The pressure transducer can be connected to the environment via a measuring opening.

If a measuring opening in the watch case is constructed such that it can be closed manually in order to connect the pressure transducer to the environment, a depth measurement can consciously be performed only if the measuring opening is opened for this purpose. If the watch is also used in other regions in which substantially higher pressures prevail than for the measuring range suitable for the pressure transducer, the pressure transducer is protected by closing the measuring opening.

As an alternative to this, a closing device of the measuring opening can be constructed as a pressure-reducing valve by means of which the measuring opening can be closed upon overshooting of a specific ambient pressure.

In a simple design, the measuring opening can in this case be closed manually by a screwed crown.

If it is possible to apply the ambient pressure outside the watch case to the mechanical pressure transducer via an incompressible medium, it is impossible for it to be damaged by pollutants and aggressive substances such as, for example, also sea water, which reach the pressure transducer from outside.

The incompressible medium can be a liquid such as, for example, water, in particular distilled water, or oil.

In a simple way, the ambient pressure can be applied to the incompressible medium via a movable wall.

If in this case the movable wall is a diaphragm which is clamped permanently and tightly at its circumferential edge on a housing, the result is simultaneously to achieve a tight separation of the region filled with the incompressible medium from the environmental region.

The purpose of transmitting the ambient pressure directly, and thus without impairment, to the pressure transducer is furthered when there is constructed in the watch case a measuring opening which serves for the application of the ambient pressure to the pressure transducer and leads to a chamber which is filled with the incompressible medium and of which one wall is the movable wall to which the ambient pressure can be applied.

A design which is particularly simple and not prone to defects consists in that the pressure transducer is an annular spring pressure gauge with an annular Bourdon spring of which one end is fastened on the watch case and is connected to the measuring opening and of which the other end, which can be freely swiveled radially, can drive in a movable fashion the depth measurement mechanism by means of which the pivoting movement of the free end of the Bourdon spring can be converted into a movement which can drive the display shaft rotatably.

For the purpose of protection against overloading, the capacity of the free end of the Bourdon spring to swivel radially can be limited by stops.

It is preferable for the Bourdon spring to be arranged surrounding the movement in the watch case, with the result that only a small overall space is required. If, in this case, the Bourdon spring is arranged with play in an annular chamber of the watch case, the walls of the annular chamber forming the stops, the Bourdon spring is simultaneously protected against overloading in conjunction with a small overall size.

The purpose of directly transmitting the ambient pressure to the Bourdon spring is furthered when the interior of the Bourdon spring is connected to the chamber via the measuring opening and is filled with the incompressible medium. In this case, the chamber with the movable wall serves at the same time as a volume-equalizing chamber for the volume of the Bourdon spring, which increases with rising pressure owing to widening of the curvature.

If the movable wall can be subjected to the action of a manually displaceable pusher in a fashion reducing the volume of the chamber, it is possible by applying a specific force to the pusher to simulate a specific dive depth, and thus to check the functionality and accuracy of the display.

Moreover, the pusher forms a support surface for the movable wall, which is constructed, in particular, as a diaphragm.

In order to define the position of the movable wall under standard ambient pressure, the capacity of the pusher to be displaced in the direction of which the volume of the chamber is increased is limited by a stop. If the stop can be set adjustably in the displacement direction of the pusher in this case, the pressure transducer can be adjusted by the pusher.

For the purpose of simple assembly, the chamber and/or the pusher can advantageously be arranged in a crown.

Since the position of the depth hand depends only on the position of the end piece, fixed to the case, of the Bourdon spring, in the case of changes in air pressure, an adjustment of the hand already comes about which falsifies the actual dive depth during a dive. In order to be able to set the depth hand exactly to zero before a dive, the end of the Bourdon spring fastened on the watch case can be adjusted radially.

For this purpose, in a simple construction the end of the Bourdon spring is fastened on the watch case via a shaft projecting radially out of the watch case, the shaft being adjustable in the direction of its longitudinal extent. For the purpose of adjusting the shaft easily, it is possible for the shaft to be guided displaceably in a crown bush which is firmly connected to the watch case and is provided with a thread on which there is arranged a union nut on which the free end of the shaft is supported. In order to permit fine adjustment, the thread can be a fine thread. The play in the thread is eliminated by virtue of the fact that a spring force is applied to the shaft axially against the union nut.

In order to connect the interior of the Bourdon spring to the environment, the shaft has an axial bore one of whose ends is connected to the environment and the other of whose ends is connected to the interior of the Bourdon spring.

If the union nut is constructed in a pot-shaped fashion and has a cover which covers the opening region, directed towards the environment, of the axial bore of the shaft, and in which one or more through bores of small cross section are constructed, the cover forms a support for the shaft. The through bores of small cross section prevent the ingress of contaminants.

The end of the shaft on the Bourdon spring end can be mounted with a transverse bore pivotably on a joint hollow screw, the axial bore of the shaft opening into an axial bore of the joint hollow screw, and the axial bore of the joint hollow screw, which is firmly connected to the Bourdon spring, opening into the Bourdon spring. The relative swivelings between the end of the Bourdon spring and shaft can be performed without stresses between these parts.

In order to permit the radial movement of the end of the Bourdon spring when the shaft is applied, the Bourdon spring can be fastened in the region of the joint hollow screw on one end of the pivoting arm whose other end can be pivoted about a pivoting axis which is arranged firmly on the watch case and extends parallel to the longitudinal axis of the joint hollow screw.

In order to be able to adjust the mechanical depth measurement mechanism and the depth hand in a simple way, the mechanical depth measurement mechanism can be arranged on the bottom side of the watch case, which is opposite the dial and can be closed by an openable case bottom. The depth measurement mechanism is thus accessible independently of the movement.

In this case, the display shaft preferably projects through the movement.

For the purpose of driving the depth measurement mechanism, the free end of the Bourdon spring can be pivotably connected via an articulated rod mechanism to a lever of a saw segment by means of which a drive pinion of the display shaft can be driven rotatably. In this case, the articulated rod mechanism is preferably pivoted with its one end at the free end of the Bourdon spring and with its other end at the free end of the saw segment lever.

In order to be able to compensate manufacturing tolerances in the Bourdon spring, the articulated rod mechanism can be set in a fashion varying its length. For this purpose, the connection of the articulated rod mechanism to the lever 26 of the saw segment is preferably guided displaceably and can be fixed in the longitudinal extent of the articulated rod mechanism.

In a simple way, it is possible in this case for the lever of the saw segment to have an elongated hole into which there project two guide pins which are arranged on the articulated rod mechanism at a smaller spacing from one another in the longitudinal extent of the articulated rod mechanism than the length of the elongated hole, it being possible for a fixing screw to be screwed in a fashion penetrating the elongated hole into a threaded hole in the lever of the saw segment, and to be pressed with its screw head on the lever of the saw segment against the articulated rod mechanism.

For the purpose of adjustment, a pin which is arranged such that it can rotate parallel to the guide pin on the lever of the saw segment and has an eccentric head can project into a bore in the articulated lever mechanism.

If a pivotably arranged spring-loaded resetting saw segment engages in the drive pinion and can be applied in order to move the drive pinion rotatably in the depth direction, the result is immediate resetting of the depth hand upon surfacing after a dive. At the same time, the saw segment remains with the flanks of its teeth always in the same direction of rotation bearing against the tooth flanks of the drive pinion, with the result that there is no tooth play to be overcome in the case of a reversal of the pivoting movement of the saw segment level upon resurfacing. This contributes to the accuracy of the depth display.

If the aim is also to display the maximum depth of a dive in a simple way, a non-return hand indicating the maximum depth of a dive can be driven pivotably in the depth direction by the pressure gauge or the depth measurement mechanism or the depth hand. Upon resurfacing, the non-return hand then remains in the position of the maximum dive depth reached.

It is possible in a simple way for the depth hand to have a driver by means of which the depth hand can strike against the non-return hand and the latter can be moved in the depth direction. A special drive for the non-return hand is therefore not required.

If the non-return hand can be driven pivotably about an axis coaxial with the rotation axis of the depth hand, it being the case that in a simple design the non-return hand is arranged on a non-return hand shaft or on a non-return hand tube surrounding the display shaft, the non-return hand and depth hand indicate their measured values on the same depth scale.

In order for the non-return hand to be able to return to its normal position after displaying a maximum depth, the pivoting movement of the non-return hand can be locked against the depth direction by a releasable latching device. In this case, in a simple design the pivoting movement of the non-return hand can be locked by a pawl-type lock.

The non-return hand shaft or the non-return hand tube can have a locking disk with a row of teeth which are arranged running around radially and in the tooth spaces of which a locking pawl can engage in a locking fashion against the depth direction.

For this purpose, it is possible, in a simple way, to construct the locking disk on its radially circumferential edge with a row of saw teeth of which the teeth are directed against the direction of rotation of the non-return hand toward depth.

For ease of movement of the locking pawl, the locking pawl can be pivotable about a pivoting axis.

In order to be able to reset the non-return hand the locking pawl can be acted upon manually in the unlocking direction, this being possible in a simple design by virtue of the fact that the locking pawl can be acted upon in the unlocking direction by an actuating slide which projects from the watch case with its one end such that it can be acted upon manually, or which can be acted upon manually by a pusher. The non-return hand can thus be reset in a simple and quick fashion. In order to define the position of the non-actuating locking slide, the unlocking slide can be spring-loaded against the direction in which the locking pawl can be acted upon.

If the non-return hand is resiliently biased against the depth direction with respect to the depth hand, it is automatically reset against as far as the stop on the depth hand after release of the latching device. In a simple way which saves overall space, it is possible, for this purpose, to provide that a biased spiral spring surrounding the display shaft is permanently arranged with its one end on the display shaft and with its other end on the non-return hand shaft or the non-return hand tube or the locking disk.

In order to prevent the locking pawl braking the locking disc, and thus to prevent a jerky movement of the non-return hand, in each case a locking pawl can be arranged at a spacing one from another in the circumferential direction of the locking disc on each lever arm of a two-arm lever which can be pivoted freely about a pivoting axis parallel to the axis of rotation of the locking disc, it being possible, upon rotation of the locking disc in the depth direction for the locking nose of one locking pawl to be moved, sliding along the tooth flank, out of a tooth space of the row of saw teeth and thereby for the two-arm lever to be pivoted in such a way that in the process the locking nose of the other locking pawl can be moved into a tooth space of the row of saw teeth.

For the purposes of decoupling the two locking pawls easily after a dive, the actuating slide can be displaceably guided approximately radially relative to the axis of rotation of the locking disc and can carry the pivoting axis of the two-arm lever.

BRIEF DESCRIPTION OF THE DRAWINGS

Exemplary embodiments of the invention are represented in the drawings and are described in more detail below.

FIG. 11 shows the crown according to FIG. 10, in the position for applying pressure, and FIG. 12 shows the crown according to FIG. 10, in the position for manual actuation.

DETAILED DESCRIPTION OF THE PREFERRED EMBODIMENTS

Figure 1:
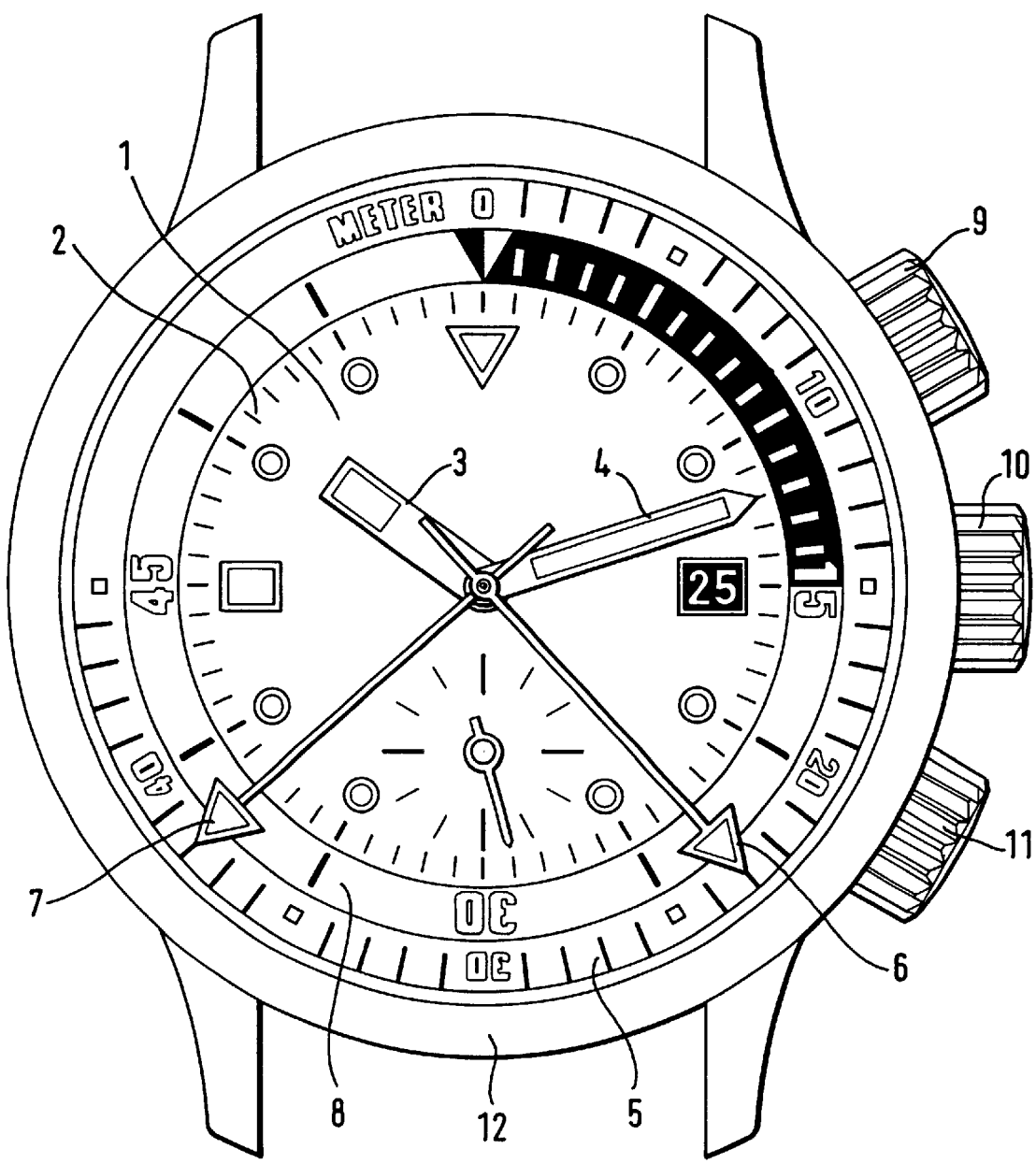
FIG. 1 shows a plan view of a dive watch.

The dive watch represented in the figures has a dial 1 with an annular hour and minute scale 2, which is assigned an hour hand 3 and a minute hand 4. The hour and minute scale 2 is surrounded by a rotatably settable dive time setting ring 8 which can be set by a pusher crown 9. The dive time setting ring 8 is surrounded in turn by a depth scale 5 which is assigned a depth hand 6 and a non-return hand 7.

The scale divisions of the hour and minute scale 2 and the depth scale 5 correspond to one another, the depth scale 5 extending from the 12 o'clock position up to the 9 o'clock position.

The pusher crown 9 also serves to trigger a resetting movement of the non-return hand 7, and a screwed crown 11 is present for applying pressure to a pressure transducer. A screwed crown 10 serves to set the time hands and for manually winding the automatic movement.

Figure 2:
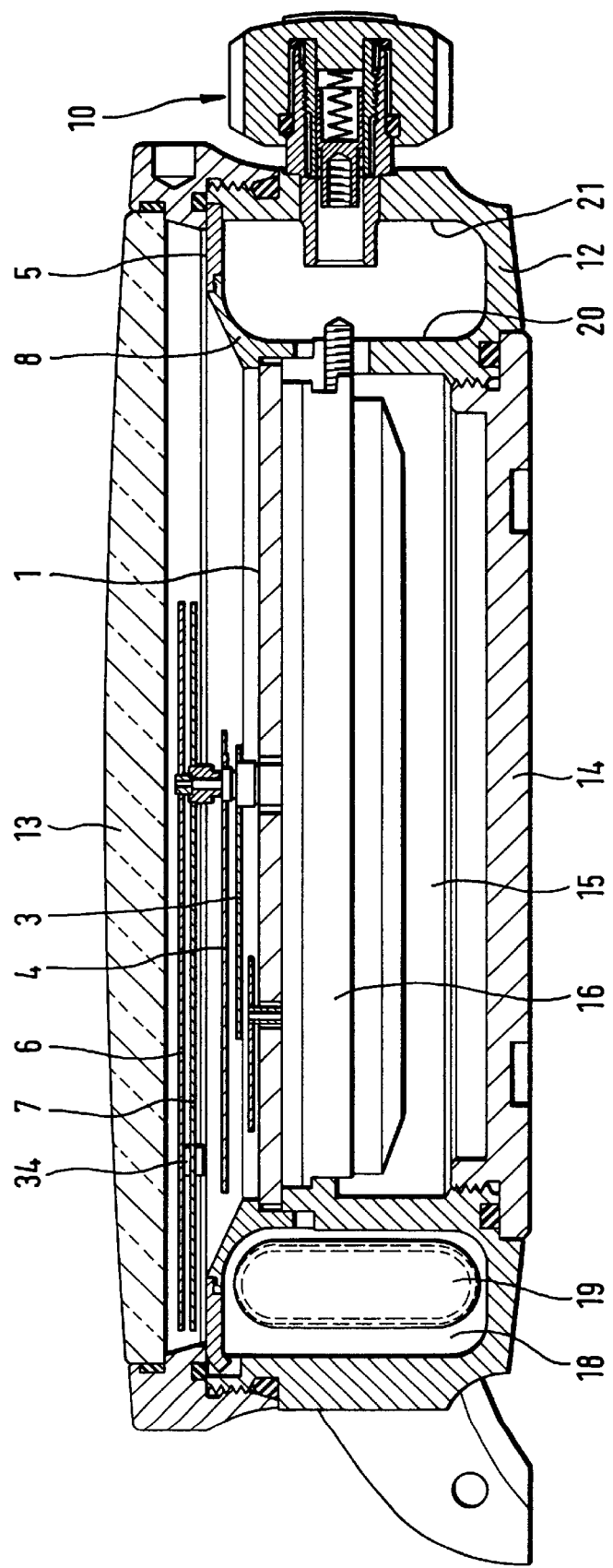
FIG. 2 shows a cross section through the dive watch according to FIG. 1.

The dive watch is represented in cross section in FIG. 2, the watch case 12 being closed on the observer side by a cover glass 13, and on the bottom side by a case bottom 14 which can be screwed in. The watch case 12 is provided with a pot-like opening 15 in which a movement 16 for driving the time hands of the watch is arranged. A depth measurement mechanism 17 (not represented in this figure) can be arranged below the movement 16 in the free space on the bottom side.

The pot-shaped opening 15 is surrounded by an annular chamber 18 of the watch case 12, in which a Bourdon spring 19 of an annular spring pressure gauge is arranged such that it can move radially. The side walls 20 and 21 of the annular chamber 18 form stops for limiting the radial deflection of the Bourdon spring 19. The crown 10 represented in section serves to set the time hands via the movement 16.

Figure 3:
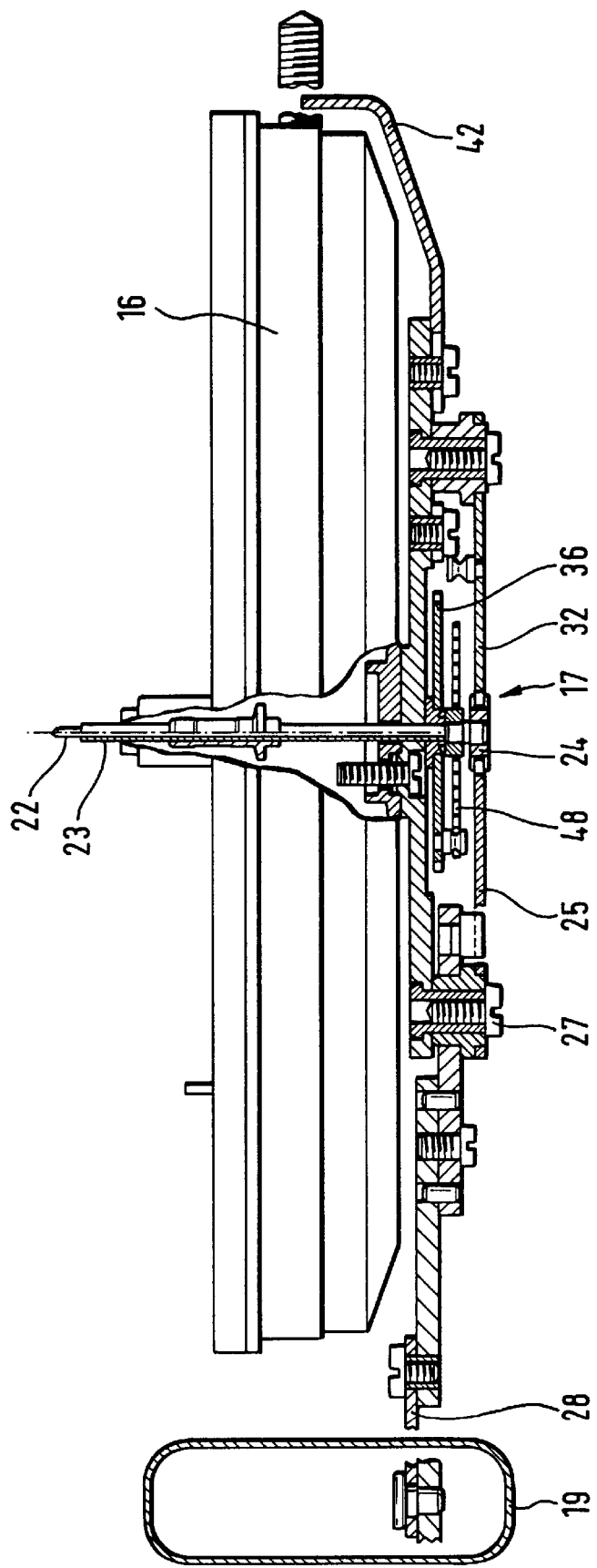
FIG. 3 shows a side view of the movement of the dive watch according to FIG. 1, with a depth measuring mechanism, in cross section.

The movement 16 and the depth measurement mechanism 17 are arranged above one another in mounting position in FIG. 3, the depth measurement mechanism 17 being represented in section. It is to be seen in this case that a display shaft 22 and a non-return hand tube 23, surrounding the display shaft 22, of the depth measurement mechanism 17 are guided through the movement 16.

Figure 4:
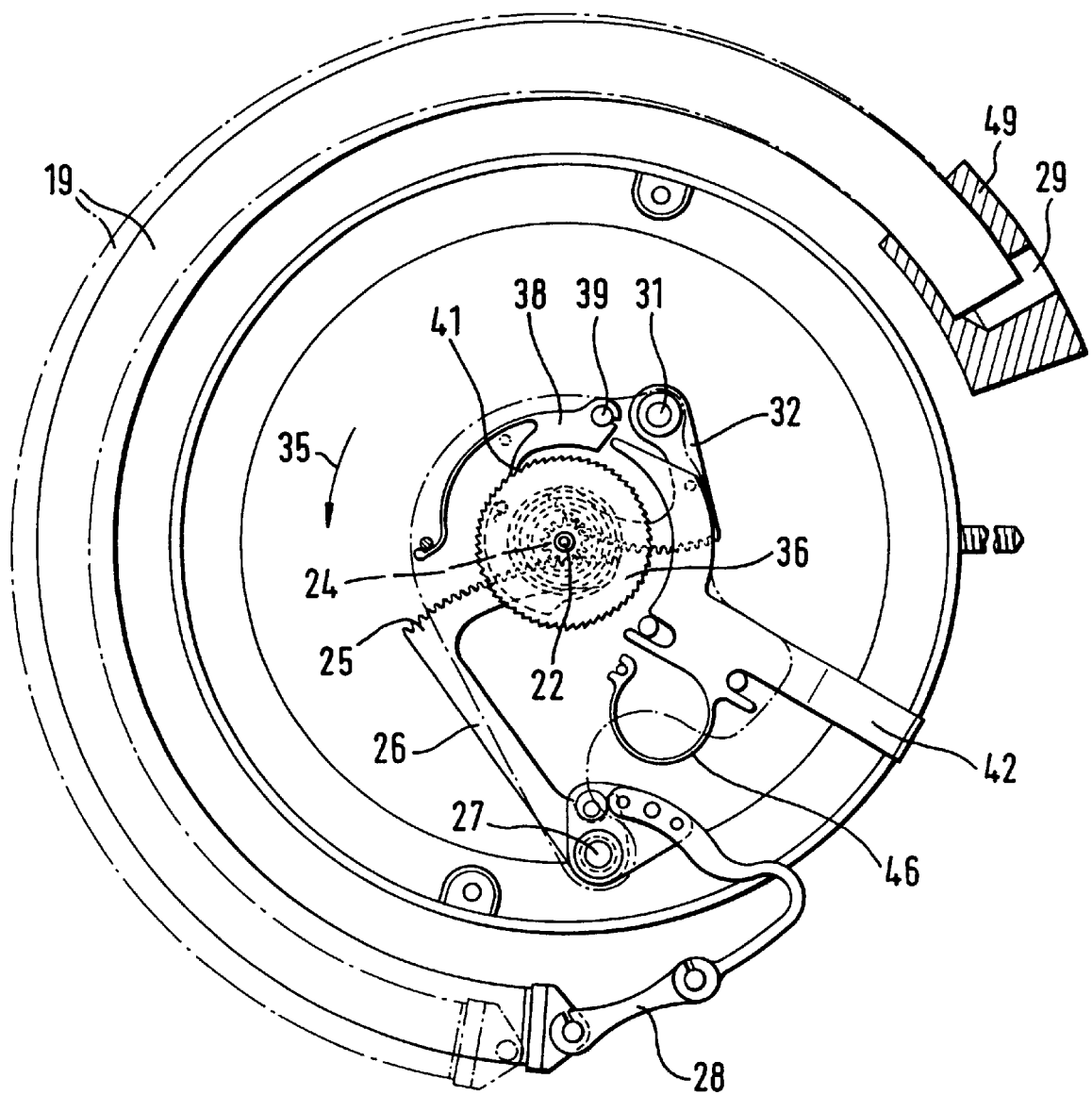
FIG. 4 shows a plan view of the depth measurement mechanism according to FIG. 3.
Figure 5:
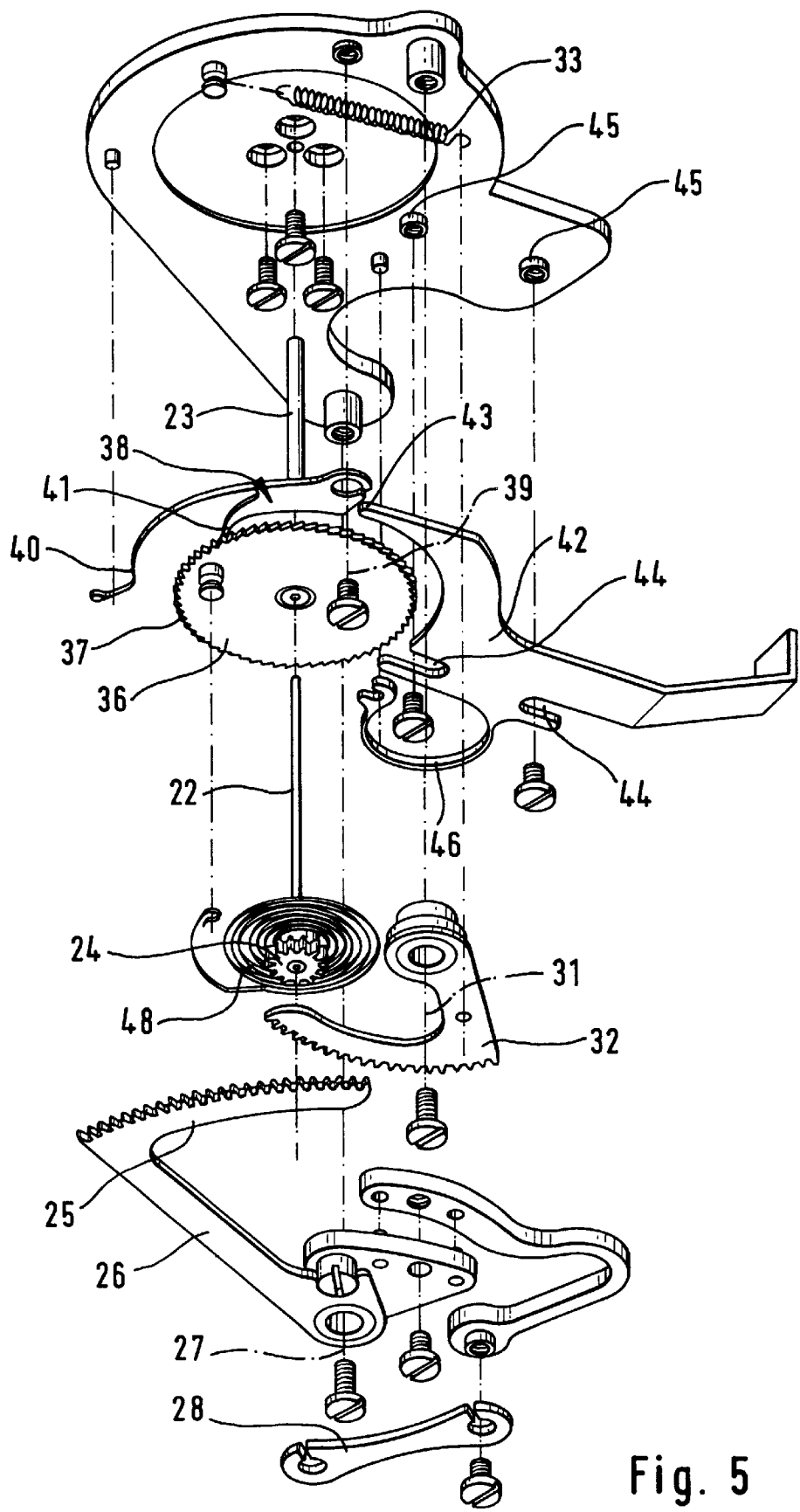
FIG. 5 shows the depth measurement mechanism according to FIG. 4 without annular spring pressure gauge, in an exploded representation.
Figure 6:
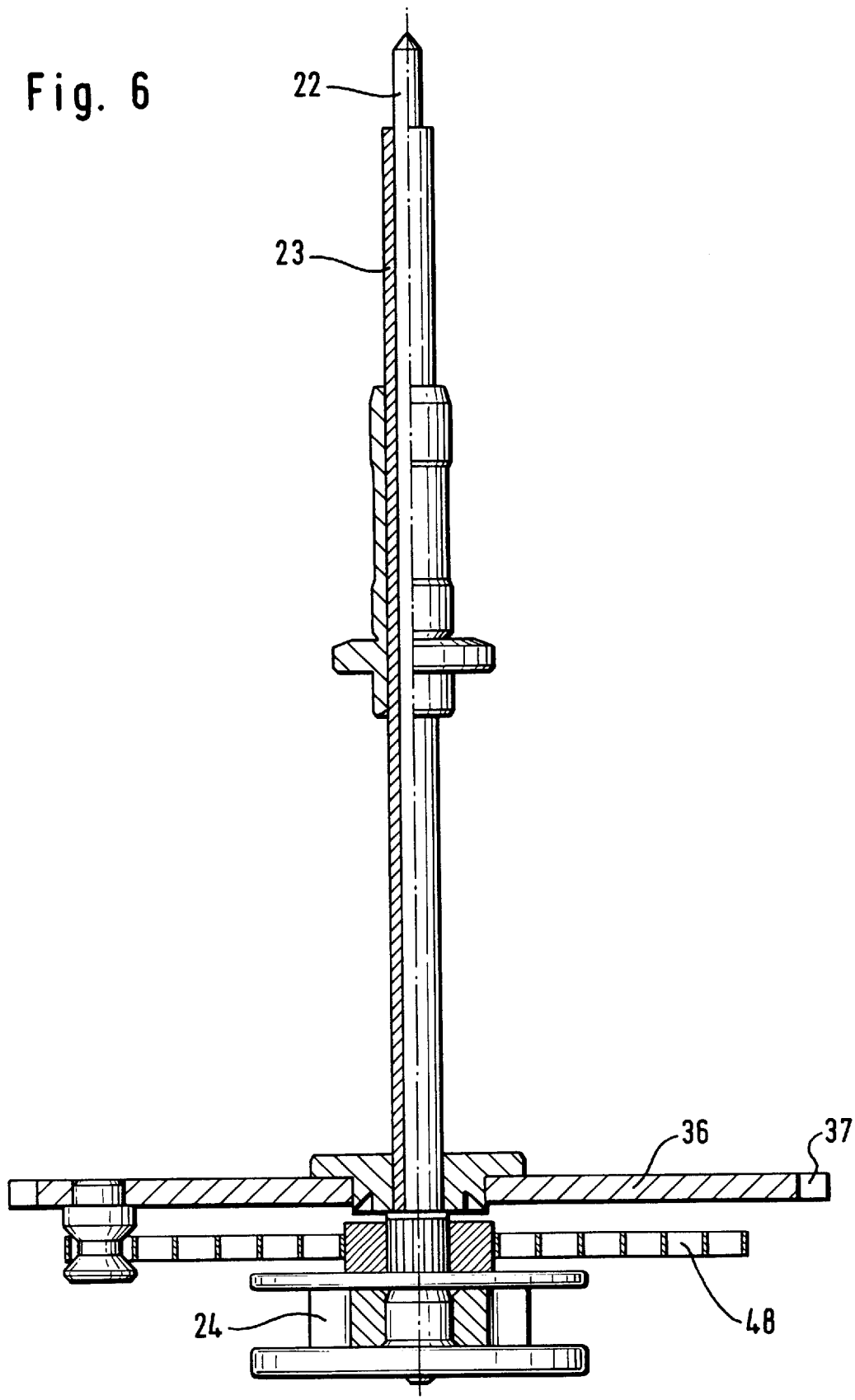
FIG. 6 shows the subassembly of the display shaft of the depth measurement mechanism according to FIG. 5.

As is also to be gathered from the further FIGS. 4 to 6, there is arranged on the lower end of the display shaft 22 a drive pinion 24 in which a saw segment 25 engages. The saw segment 25 has a lever 26 which is mounted at its end opposite the saw segment 25 such that it can pivot about a pivoting axis 27. Pivoted with its one end at the saw segment lever 25, which is constructed in two parts, is an articulated rod mechanism 28, while with its other end it is pivoted at the free end of the Bourdon spring 19.

This Bourdon spring 19 closed at its free end is fastened with its other end on the watch case 12 and connected via a connecting opening 29 to a measuring opening 30 via which the Bourdon spring 19 can be connected to the ambient pressure outside the watch case 12. The Bourdon spring 19 can change its curvature in accordance with this ambient pressure, and this is shown in FIG. 4 by representing the Bourdon spring 19 with a continuous and a broken line. When the ambient pressure rises, the curvature of the Bourdon spring 19 expands and, via the articulated rod mechanism 28, swivels the saw segment 25 about the pivoting axis 27. Via the drive pinion 24, this rotates the display shaft 22, and thus swivels the depth hand 6 (not represented) arranged on the upper end of the display shaft 22. The depth hand 6 thus indicates the instantaneous dive depth on the depth scale 5.

A resetting saw segment 32 which can pivot about a pivoting axis 31 likewise engages in the drive pinion 24. The drive pinion 24 is acted upon in the depth direction by means of a resetting spring 33 applied to the resetting saw segment 32, with the result that when the ambient pressure drops through surfacing, the drive pinion 24, and thus the depth hand 6 are swiveled to the start of the depth scale 5. Furthermore, the resetting spring 33 and the resetting segment 32 ensure that the saw segment 25 always bears in the same direction against the teeth of the drive pinion 24, and therefore no backlash is produced.

As is to be seen in FIG. 2, the depth hand 6 has a driver 34, which is constructed as a stop and which, when the depth hand 6 moves in the depth direction 35, that is to say in the direction of greater dive depth, bears against the non-return hand 7 and drives the latter in the depth direction 35. In the inverse direction of movement of the depth hand 6, the non-return hand 7 remains in its position of maximum depth, into which it has been moved by the depth hand 6. The non-return hand 7 thus shows the maximum depth of a dive. The non-return hand 7 is arranged on the non-return hand tube 23, which surrounds the display shaft 22 and likewise projects through the movement 16.

On the end opposite the non-return hand 7, the non-return hand tube 23 has a circular locking disk 36 which is provided on its radially circumferential edge with a row of saw teeth 37. The radially directed teeth of the row of saw teeth 37 are directed against the direction of rotation of the non-return hand 7 toward depth. It is possible to latch into the spaces of the teeth of the row of saw teeth 37 a locking pawl 38 which can be pivoted about a pivoting axis 39 parallel to the non-return hand tube 23, and can be applied with its latching nose 41 against the row of saw teeth 37 by a spring arm 40 which is constructed in one piece with the locking pawl 38 and is supported in a biased fashion on a subassembly fixed to the case.

As a result, the non-return hand 7 can be swiveled unimpeded in the depth direction 35 together with the depth hand 6. If the depth hand 6 then moves back again, the non-return hand 7 is held in its position by the locking pawl 38, which has latched in a tooth space of the row of saw teeth 34 and locks a return movement of the non-return hand 7.

However, a manually actuable unlocking device is present in order also to permit the non-return hand 7 to be reset. This device comprises an actuating slide 42 which is guided such that it can be displaced radially relative to the non-return hand tube 35 and it is possible for its one end 42 to act on the locking pawl 38 to pivot in such a way that the latter raises its locking nose 41 out of the row of saw teeth 37. The actuating slide 42 has two grooves 44 which extend in the direction of movement and into which permanently arranged guide pins 45 project. This provides the radial guidance of the actuating slide 42.

In the normal position, in which the actuating slide 42 is out of engagement with the locking pawl 38, the actuating slide 42 is biased by a biased spring arm 46 which is constructed in one piece with the actuating slide 42 and is supported on a subassembly fixed to the case.

Figure 9:
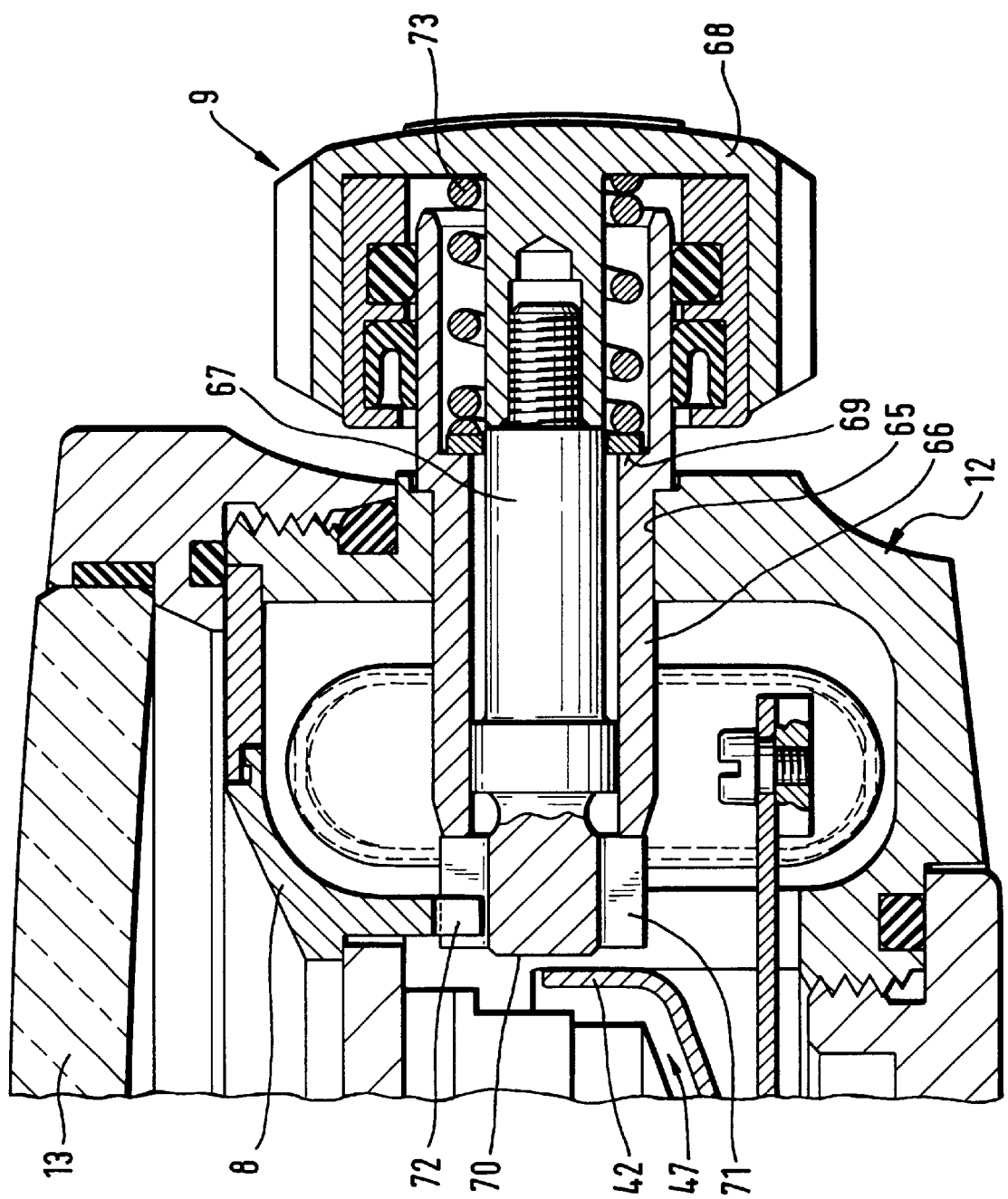
FIG. 9 shows a partial cross section through the dive watch according to FIG. 1 in the region of a pusher crown.

The end, opposite the locking pawl 38, of the actuating slide 42 can be acted upon displaceably through the pusher shaft 47 of the pusher crown 9 represented in FIG. 9.

In order for the non-return hand 7 also to move against the depth direction when the locking disk 36 is unlocked, an adequately biased spiral spring 48 is present, which surrounds the display shaft 22 and is fastened with its inner end on the display shaft 22, and with its outer end on the locking disk 36.

Figure 7:
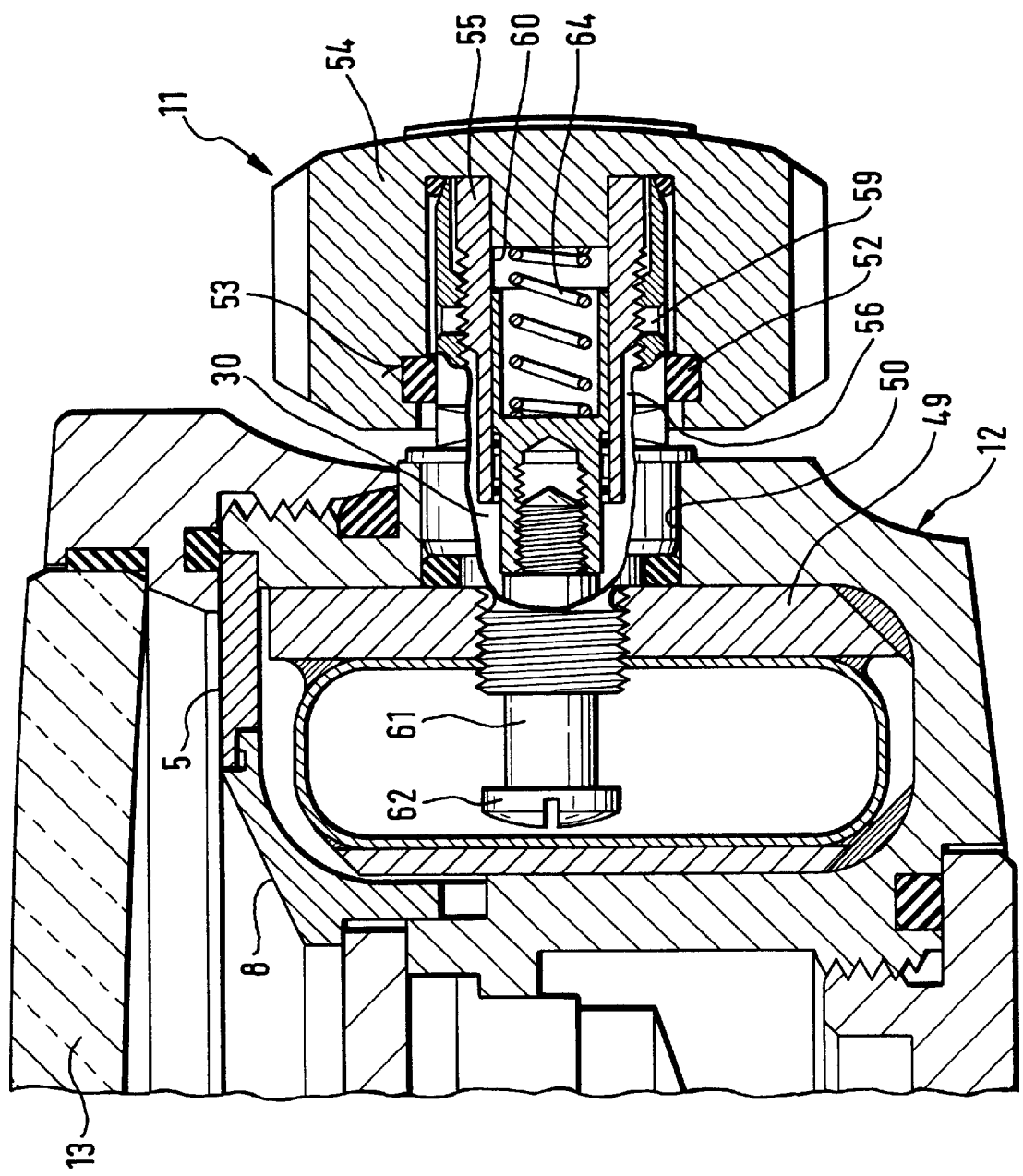
FIG. 7 shows a partial cross section through the dive watch according to FIG. 1 in the region of the screwed crown in the closed position thereof.
Figure 8:
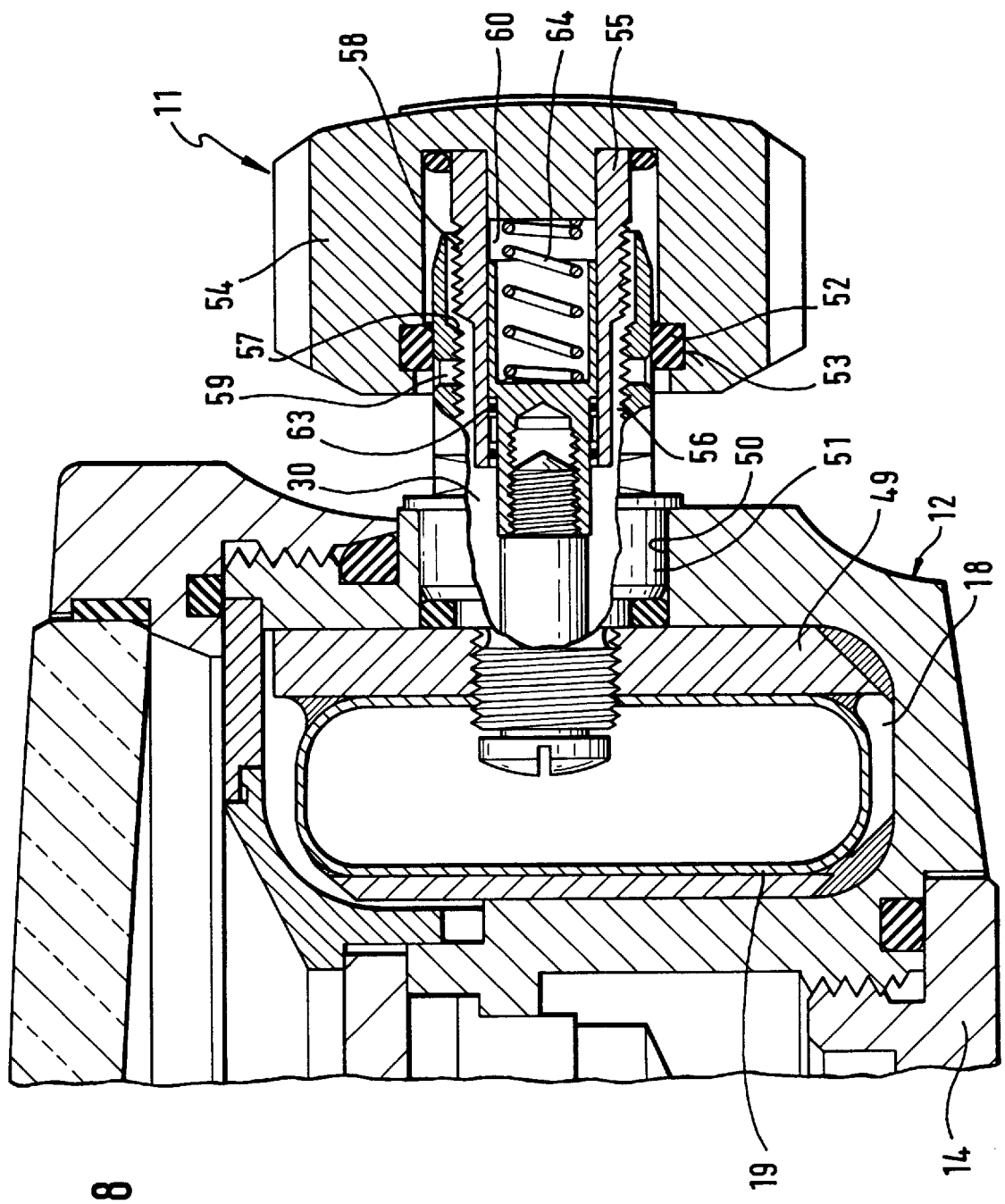
FIG. 8 shows the partial cross section according to FIG. 7 in the open position of the screwed crown.

As is to be seen in FIGS. 4, 7 and 8, the Bourdon spring 19 has at its end fastened on the watch case 12 a holding part 49 by means of which it is fastened on the watch case 12. Via the disgorging opening of the Bourdon spring 19, the interior thereof is connected to the connecting opening 29, which disgorges radially outward, of the holding part 49, which leads, in turn, to the measuring opening 30 of the screwed crown 11.

The screwed crown 11 is represented in the closed position in FIG. 7, and in the open position in FIG. 8. Inserted tightly in a radially penetrating case opening 50 is a guide shaft 51 which projects radially outward and is provided with the axially penetrating measuring opening 30. In this arrangement, the outer lateral surface, which runs around radially, the guide shaft 51 forms a sliding surface on which a sealing ring 52 surrounding the guide shaft 51 is seated such that it can be displaced both axially and in the circumferential direction.

The sealing ring 52 is seated with its radially external region in an annular groove 53 of a crown head 54 which reaches over the guide shaft 51 in the fashion of a pot. The crown head 54 has a center pin 55 which projects into the measuring opening 30. An annular gap 56 is formed in the free end region of the pin 55 between the pin 55 and the wall of the measuring opening 30, while at the free end region of the guide shaft 51 the measuring opening 30 is provided with an internal thread 57 into which the pin 55 can be screwed with an external thread 58 in the region closer to the crown head 54. By rotating the crown head 54, the pin 55 thereof is screwed further into the measuring opening, or screwed further out of the measuring opening 30. In this case, the sealing ring 52 changes position axially from a position close to the case to a position remote from the case.

Constructed in the guide shaft 51 between these two positions are radially penetrating ventilation openings 59 via which the measuring opening 30 can be connected to the external environmental region when the sealing ring 52 is in its position remote from the case. If it is located in its position close to the case, it shuts off the connection of the measuring opening 30 with the external environmental region.

The pin 55 is provided with a base bore 60 which is open toward the interior of the case and in which a stop slide 61 is arranged in an axially displaceable fashion. On its one end projecting into the connecting opening 29, the stop slide 60 has a radial extension 62 which is larger than the cross section of the measuring opening 30. Since the capacity of the stop slide 61 to move axially in the base bore 60 is limited by stops 63, in the case of a movement to screw on the crown head 54 the radial extension 62 strikes against the internal disgorging region of the measuring opening 30, the result being to limit the screwing-on movement of the crown head 54.

In order for the stop slide 61 normally to be located in its furthest extended position and not inadvertently to close the measuring opening with the radial extension, a biased compression spring 64 supported on the bottom of the base bore 60 acts on the stop slide 61 in the direction toward the interior of the watch case 12.

As already stated, the pusher crown 9 represented in FIG. 9 serves both as a crown for adjusting the dive time setting ring 8 and as a pusher for acting on the actuating slide 42 to act on the locking pawl 38. Inserted tightly for this purpose in a radially penetrating case opening 65 is a guide shaft 66 in which an actuating pin 67 is arranged to be guided such that it can both move axially and rotate. Arranged on its outwardly directed end on the actuating pin 67 is a crown head 68 on which there is supported a compression spring 73 which surrounds the actuating pin 67 and is supported with its other end on a step 69 in the case opening 65. The actuating pin 67 is thereby always biased to be moved into its radially external position. By manually pressing on the crown head 68, the latter moves the actuating pin 67 into the watch case 12 until the actuating pin 67 acts with its end face 70 on the actuating slide 42, and the latter swivels the locking pawl 38 in the releasing direction.

Furthermore, there is arranged on that end of the actuating pin 67 which projects into the watch case 12 a positioning pinion 71 which engages in a row of teeth 72 which extends along the drive time setting ring 8 on the underside thereof in the circumferential direction of the drive time setting ring 8. The setting position of the drive time setting ring 8 is varied by rotating the crown head 68, and thus the actuating pin 67 and the positioning pinion 71.

Figure 10:
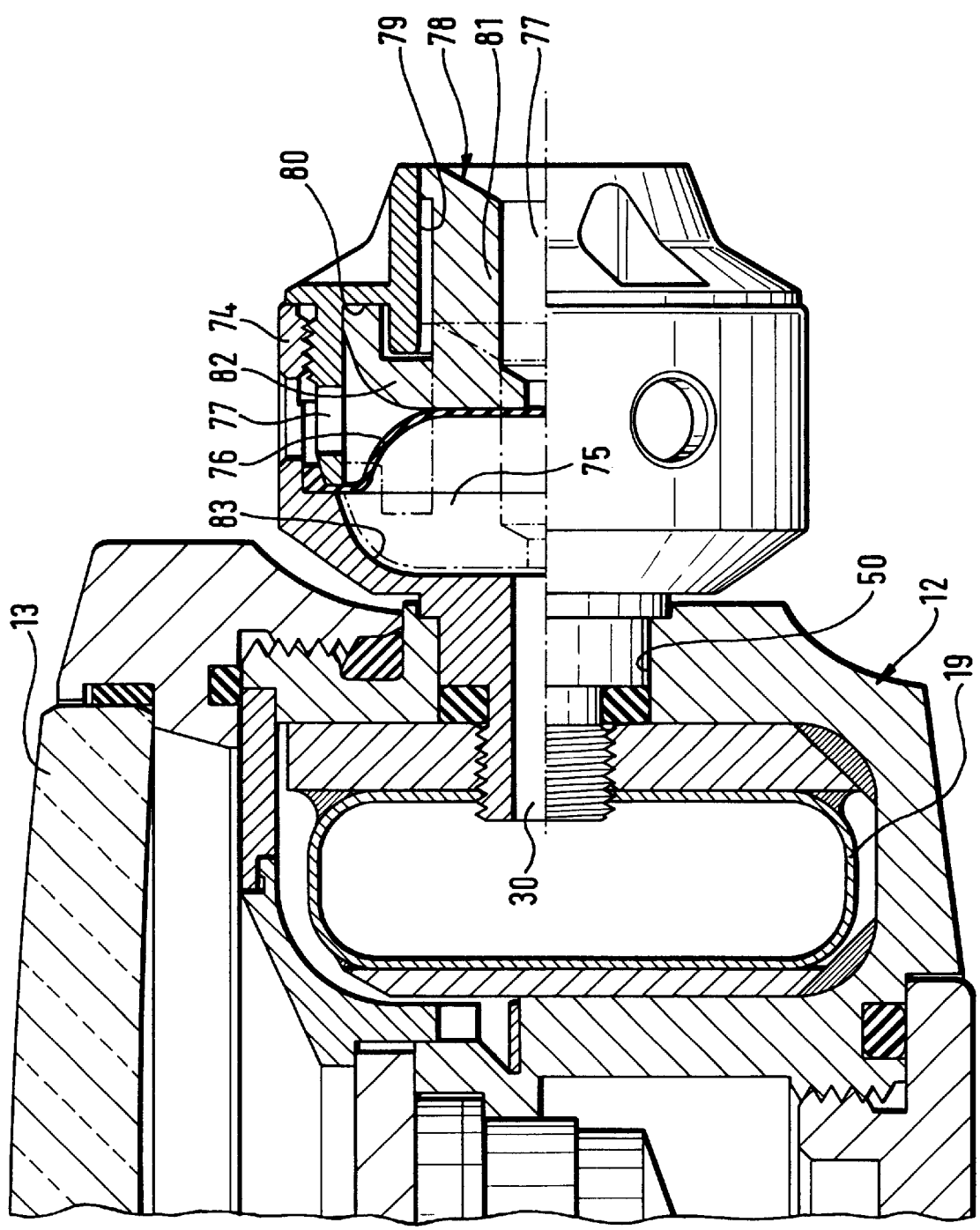
FIG. 10 shows a partial cross section through a further exemplary embodiment of a dive watch in the region of a crown, in the position for ambient pressure.

In the exemplary embodiment of FIGS. 10–12, the watch case 12, the movement, the depth measurement mechanism and the annular spring pressure gauge have the same design as in the case of the exemplary embodiment of FIGS. 1–9, and are therefore partially not represented.

Instead of the screwed crown 11 in the exemplary embodiment of FIGS. 1–9, in the case of the exemplary embodiment of FIGS. 10–12 there is inserted into the case opening 50 a crown 74 which likewise has a measuring opening 30.

The measuring opening 30 leads from the interior of the Bourdon spring 19 to a chamber 75, which is constructed in the head of the crown 74 and is of larger diameter than the measuring opening 30. The wall of the chamber 75 opposite where the measuring opening 30 disgorges is a movable wall which is constructed as a diaphragm 76 and to whose side averted from the interior of the chamber 75 it is possible to apply the ambient pressure via ventilation bores 77 in the crown 74 and in a pusher 78 guided displaceably in the crown 74.

The pusher 78 is guided displaceably in a guide bore 79, coaxial with the measuring opening 30, of the crown 74, its capacity to be displaced in the direction in which the volume of the chamber 75 is increased being limited by a stop 80 on the crown 74.

The shaft 81 of the pusher 78, which projects into the guide bore 79, can be acted upon manually on its outwardly directed end face, and can be displaced in the direction reducing the volume of the chamber 75.

On its end facing the chamber 75, the pusher 78 is provided with a mushroom head 82 against which the diaphragm 76 can bear and be supported, and via which the diaphragm 76 can be deflected in the direction reducing the volume of the chamber 75 when the pusher 78 is acted upon manually.

The interior of the Bourdon spring 19, the measuring opening 30 and the chamber 75 are filled with an oil in a fashion free from bubbles.

When standard ambient pressure is applied to the outside of the diaphragm 76 via the ventilation bores 79, the diaphragm 76 is located in the position represented in FIG. 10.

If the pressure acting on the diaphragm 76 from outside rises during a dive, this raised pressure is transmitted via the diaphragm onto the oil which is located in the chamber 75 of the measuring opening 30 and the interior of the Bourdon spring 19 and which in turn expands the curvature of the Bourdon spring 19.

The curvature of the Bourdon spring 19 expands to a greater or lesser extent depending on the level at which pressure is applied to the diaphragm 76, and leads via the depth measurement mechanism 17 to the appropriate setting of the depth hand 6.

Since in the case when the Bourdon spring 19 expands the volume of its interior is increased, the diaphragm 76 moves from the position represented in FIG. 10 as far, at most, as the position represented in FIG. 11, in which it comes to bear against the bottom 83 of the chamber 75 and cannot be further deflected and damaged even in the case of a further rise in pressure.

Consequently, the reduction in the volume of the chamber 75 constitutes equalization of the volume for the enlargement of the volume of the interior of the Bourdon spring 19.

In order to be able under standard ambient pressure to simulate application of pressure to the diaphragm 76 and thus the Bourdon spring 19, it is possible by manually actuating the pusher 78 likewise to move the diaphragm 76 in the direction in which the volume of the chamber 75 is reduced, and to display a pressure value of the depth hand 6 in accordance with the force applied.

In the case of the exemplary embodiment of the articulated rod mechanism 28 as represented in FIGS. 4 and 5, it is necessary for the active length of the swan neck region thereof to be varied by bending, in order to compensate manufacturing tolerances in the Bourdon spring 19. This is very expensive and imprecise.

Figure 13:
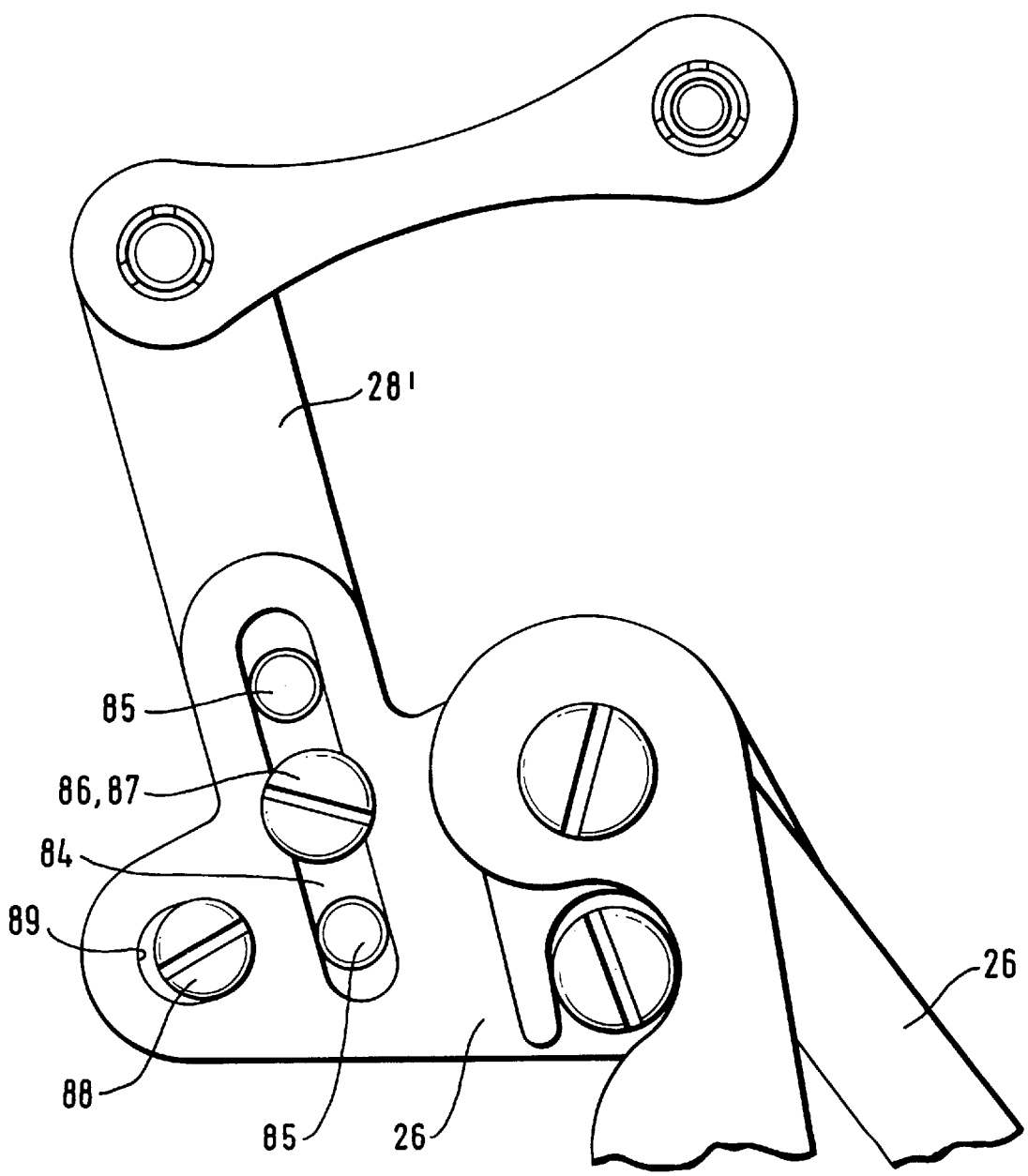
FIG. 13 shows a further exemplary embodiment of an articulated rod mechanism of the dive watch according to FIG. 1.

In the case of the exemplary embodiment of the articulated rod mechanism 28' represented in FIG. 13, said mechanism is constructed with a variable length by virtue of the fact that its connection to the lever 26 of the saw segment is guided displaceably and can be fixed in the longitudinal extent of the articulated rod mechanism 28'. For this purpose, the lever 26 of the saw segment has an elongated hole 84 into which there project two guide pins 85 which are arranged on the articulated rod mechanism 28' at a smaller spacing from one another in the longitudinal extent of the articulated rod mechanism 28' than the length of the elongated hole 84. A threaded bore is constructed in the articulated rod mechanism 28' between the two guide pins 85. A fixing screw 86 projects with its shaft through the elongated hole 84, and is screwed into the threaded bore. With its screw head 87, it rests on the lever 26 of the saw segment in the edge region of the elongated hole 84 and clamps said lever against the articulated rod mechanism 28'.

In order to adjust the length of the articulated rod mechanism 28', the fixing screw 86 is loosened so that the articulated rod mechanism 28' can be led through the guide pins 85 projecting into the elongated hole 84, can be displaced relative to the lever 26 of the saw segment, and can be fixed by subsequently screwing the fixing screw 86 tight.

The relative displacement is performed in this case by means of a pin which can be rotated parallel to the guide pins 85, is arranged on the articulated rod mechanism 28' and projects with an eccentric head 88 into a bore 89 of the lever 26 of the saw segment. The rotation of the eccentric head 88, provided with a slot for a screwdriver, in the bore 89 effects a fine displacement of the lever 26 of the saw segment relative to the articulated rod mechanism 28'.

Figure 14:
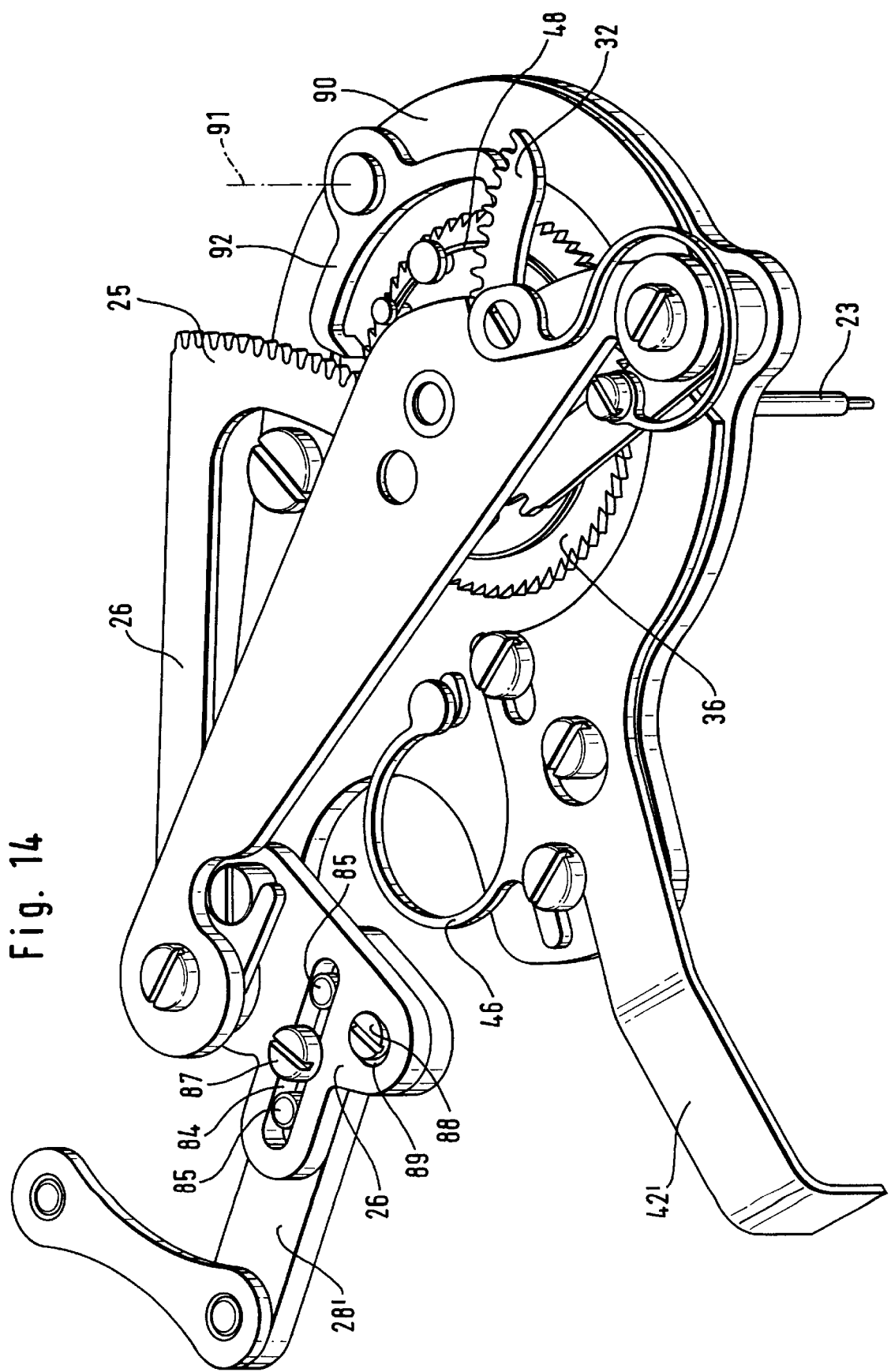
FIG. 14 shows a perspective view of a further exemplary embodiment of a depth measuring mechanism of a dive watch according to FIG. 1.

This construction of the articulated rod mechanism 28' is also to be seen in the exemplary embodiment, represented in FIG. 14, of a depth measuring mechanism which corresponds largely to the depth measuring mechanism of FIGS. 4 and 5. The only difference is the construction of the locking pawl and the application to it of the actuating slide 42'.

Figure 15:
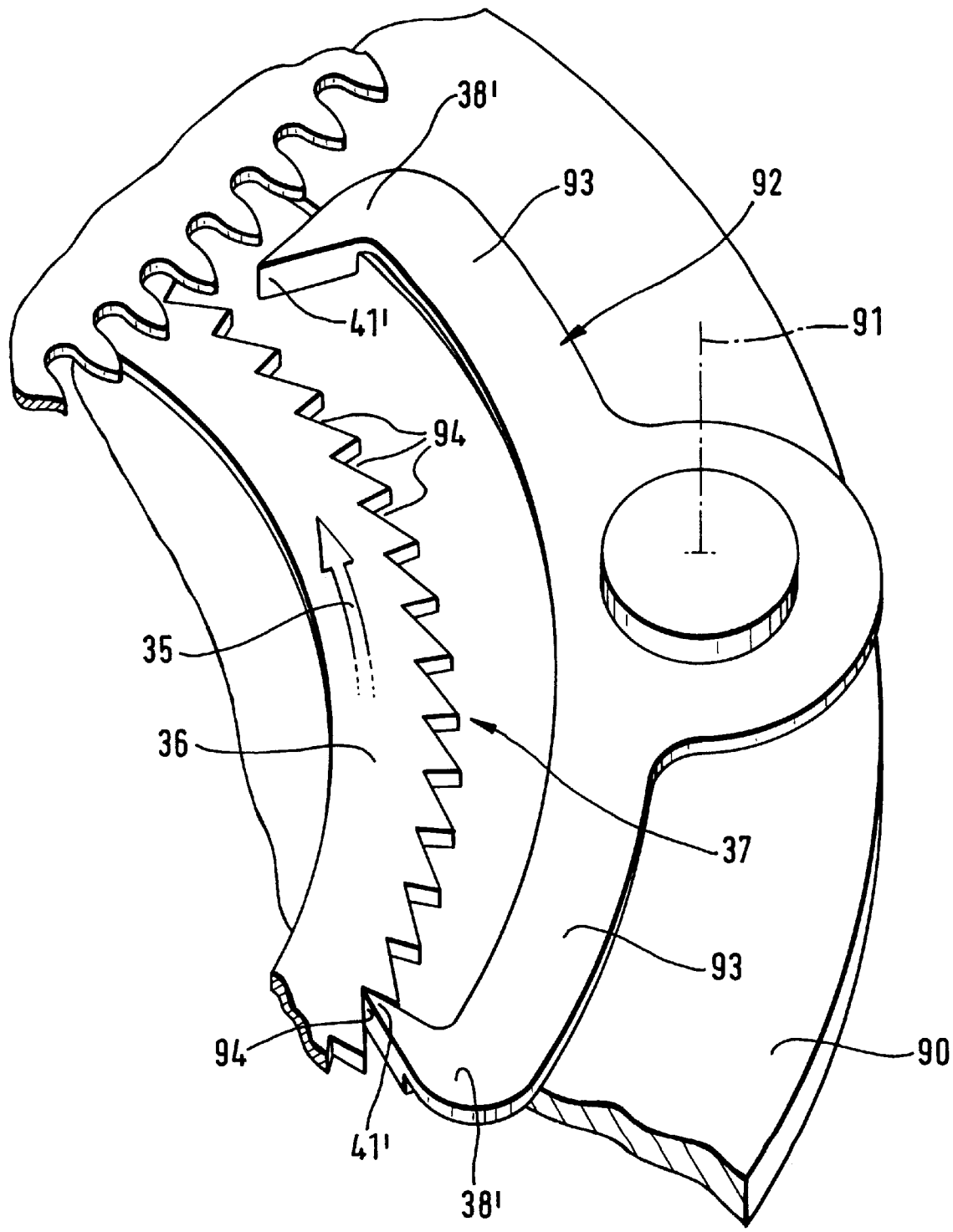
FIG. 15 shows a view of a section of the depth measuring mechanism according to FIG. 14 in the region of the locking pawls of the locking disc.

In FIG. 14, the actuating slide 42' largely surrounds the locking disc 36 with an arm 90. Situated approximately diagonally opposite the actuating part of the actuating slide 42', there is arranged on the arm 90 a pivoting axis 91 which is parallel to the axis of rotation of the locking disc 36 and on which a two-arm lever 92 is mounted such that it can pivot freely. Arranged on the free ends of each lever arm 93 of the lever 92 is a locking nose 41' of a locking pawl 38', of which in the normal position, represented in FIGS. 14 and 15, of the actuating slide 42' a locking pawl 38 is always located in a tooth space 94 of the row 37 of saw teeth of the locking disc 36. By rotating the locking disc 36 in the depth direction 35 during a dive, the locking nose 41' of the locking pawl 38' located in the tooth space 94 slides along the long tooth flank of a saw tooth and is thus moved out of the tooth space 94. This effects swiveling of the lever 92, and thus moves the other locking pawl 38' into a tooth space 94. As a result, one of the locking pawls 38' is always located in one of the tooth spaces 94 and upon surfacing prevents the locking disc 36 and the non-return hand 7 from being turned back. After a dive, the diver can therefore read off at leisure the maximum dive depth he has previously reached. If, after reading off the maximum dive depth, the diver wishes to zero the non-return hand 7 again, he need only apply the actuating slide 42' against the force of the spring arm 46 in the direction of the locking disc 36. As a result, however, the arm 90 is displaced, and thus also the pivoting axis 91 and the lever 92 so far from the locking disc 36 that the two locking pawls 38' are moved out of the tooth spaces 94 of the locking disc 36. The spiral spring 48 can then reset the non-return hand 7 to the zero position without hindrance.

Figure 16:
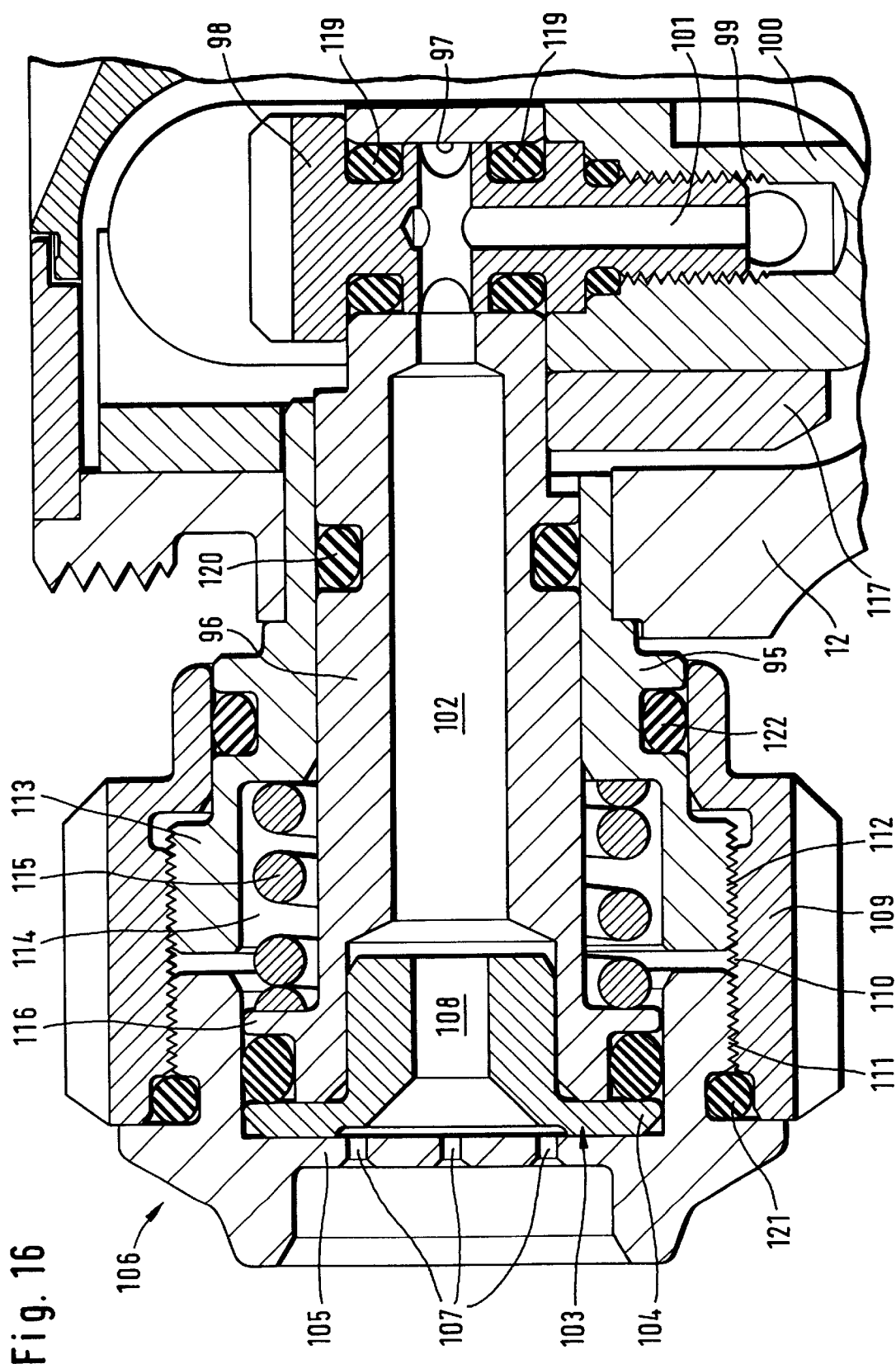
FIG. 16 shows a cross section of a crown for applying ambient pressure to a Bourdon spring for a dive watch according to FIG. 1.
Figure 17:
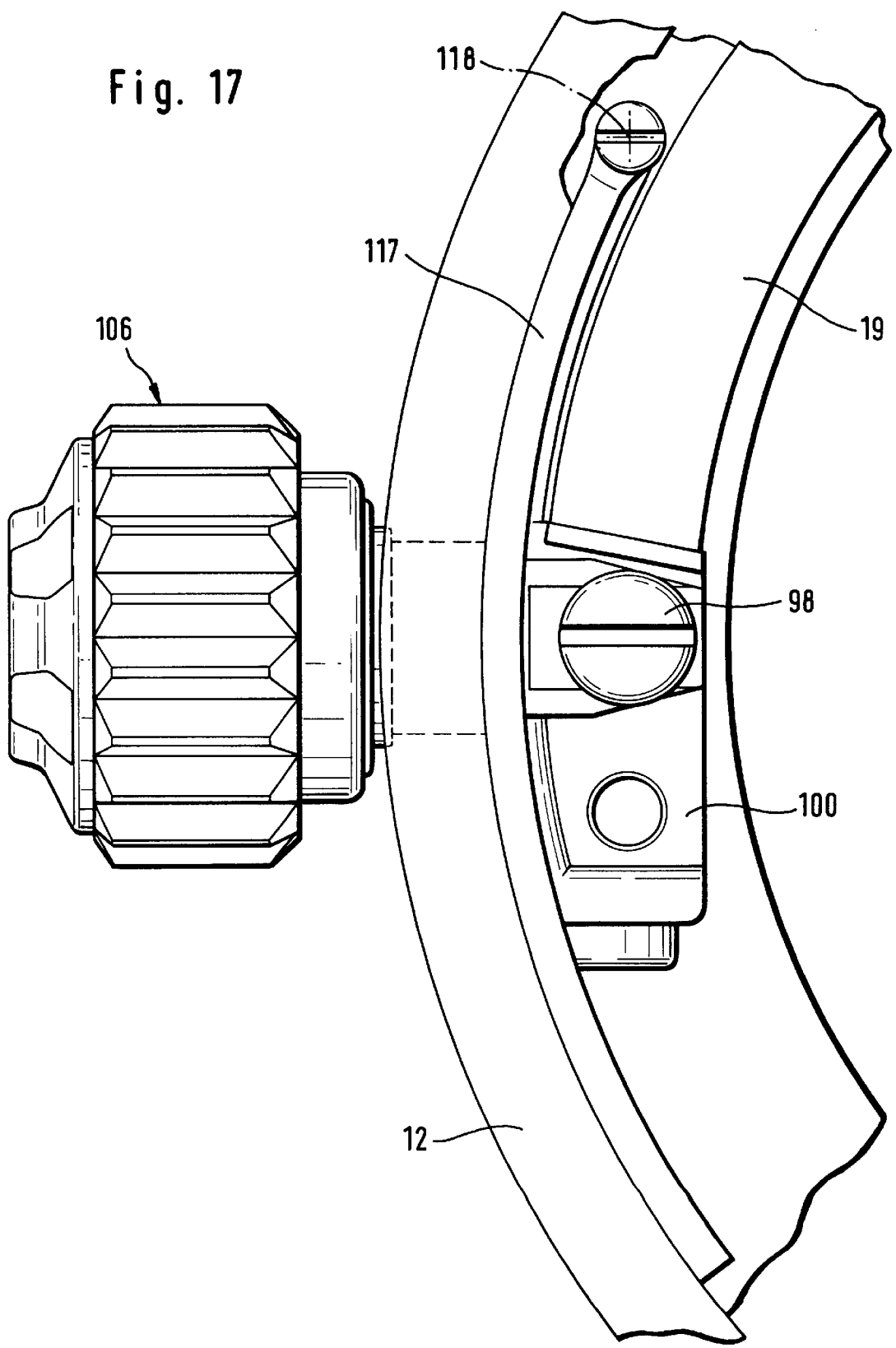
FIG. 17 shows a view of the crown connected to an end of the Bourdon spring and according to FIG. 16.
Figure 18:
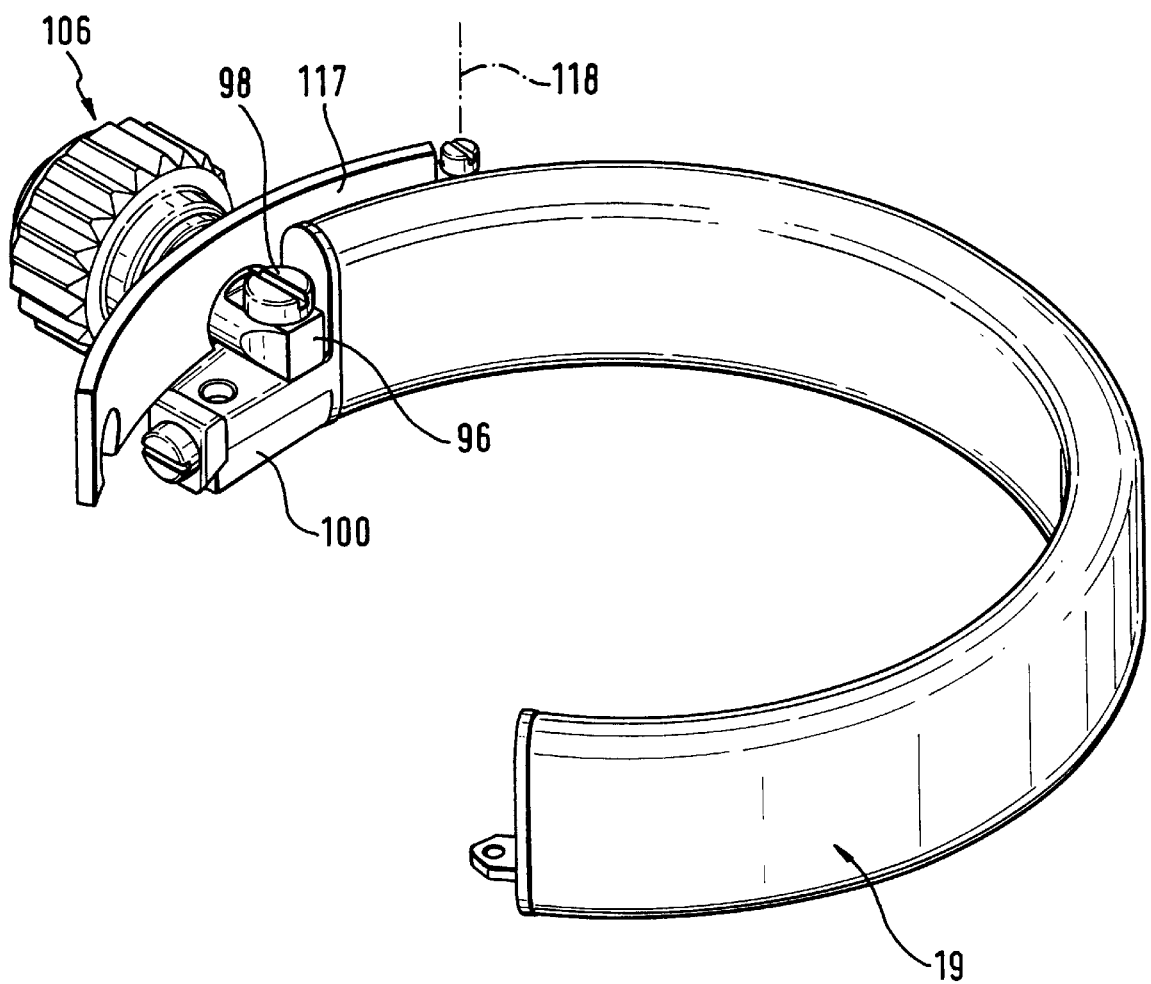
FIG. 18 shows a perspective view of the crown and Bourdon spring according to FIG. 16.
Figure 19:
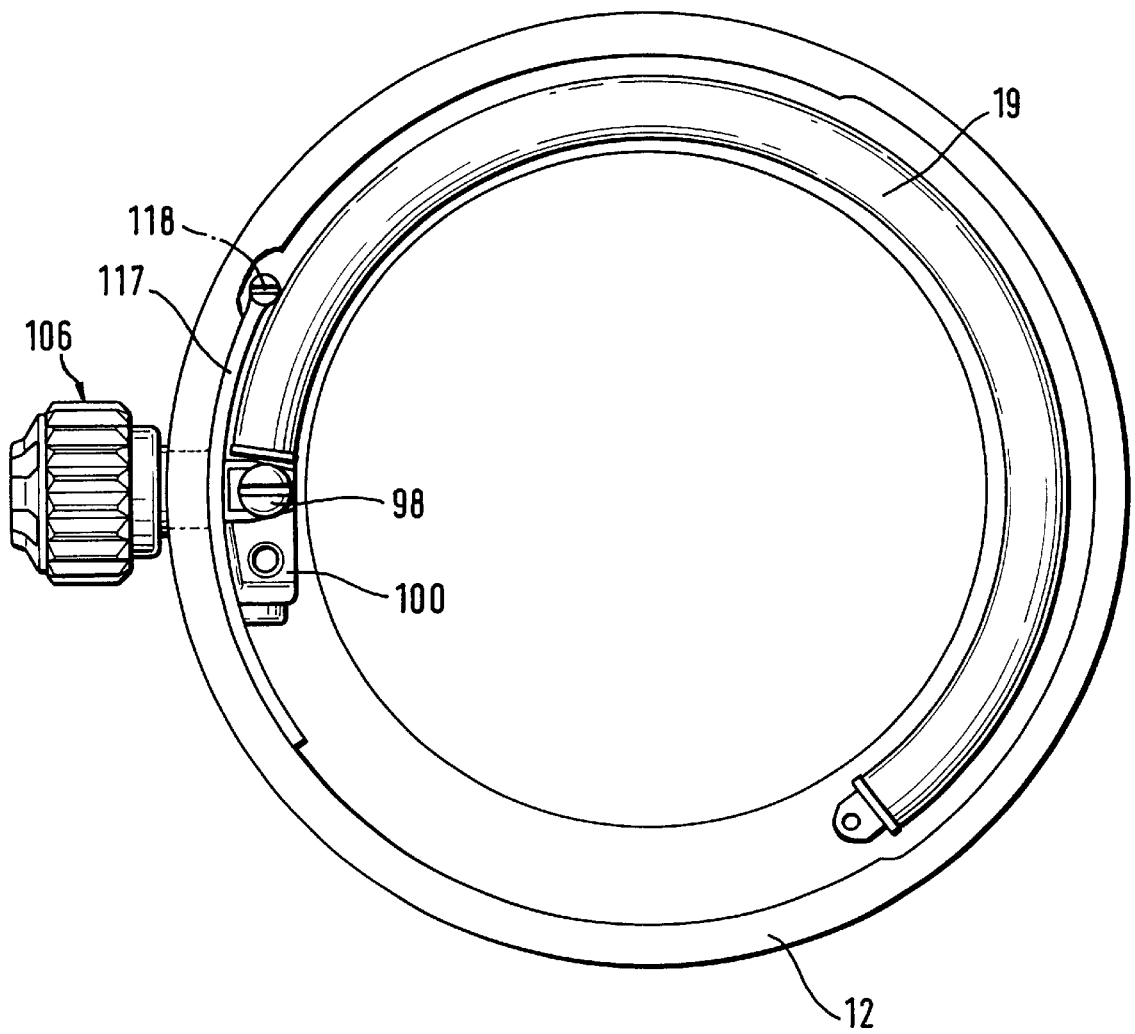
FIG. 19 shows a plan view of the crown and Bourdon spring according to FIG. 16 in a watch case.

The crown represented in FIG. 16 has a crown bush 95 which is arranged firmly in the watch case 12 and projects away upward radially therefrom. Arranged in an axially displaceable fashion in the through bore of the crown bus 95 is a shaft 96 which is sealed by a sealing ring 120 and whose end projecting into the watch case 12 has a transverse bore 97. A joint hollow screw 98 is sealingly inserted with its upper end in the transverse bore 97 via sealing rings 119 in such a way that the shaft 96 can pivot on the joint hollow screw 98. The joint hollow screw 98 is screwed with its lower end into a threaded bore 99 of an end piece 100 of the Bourdon spring 19.

The continuous axial bore 102 of the shaft 96 is connected to the interior of the Bourdon spring 19 via passage 101 in the joint hollow screw 98.

The axial bore 102 of the shaft 96 is widened in a stepped fashion at the end averted from the watch case 12, and holds a sliding bush 103. On the end projecting out of the axial bore 102 widened in a stepped fashion, the sliding bush 103 has a flange-like extension 104 which is, in turn, supported axially on a cover 105 of a union nut 106 constructed like a pot.

Since the cover 105 has a plurality of through bores 107 of small diameter, and the sliding bush 103 likewise has an axial bore 108, it is possible during a dive for ambient pressure to be applied to the liquid located in the Bourdon spring 19 via the through bores 107, the axial bores 108 and 102 and the passage 101 in the joint hollow screw 98. However, contaminants are largely prevented from entering the axial bores 108 and 102 and the Bourdon spring 19 by the small cross section of the through bores 107.

The union nut 106 is of bipartite construction, the hollow cylindrical part 109 adjoining the cover 105 having an internal thread 110, one end of which screws the hollow cylindrical part 109 onto an external thread 111 of the cover 105. A sealing ring 121 is arranged in the connecting region between the cover 105 and the hollow cylindrical part 109.

At the other end, the hollow cylindrical part 109 is screwed with its internal thread 110 onto an external thread 112 on a flange-like extension 113 of the crown bush 95.

The internal thread 110 and the external threads 111 and 112 are fine threads.

By rotating the union nut 106 on the external thread of the crown bush 95, the shaft 96 can be set in an axially displaceable fashion in the crown bush 95 via the cover 105 and the sliding bush 103. However, the end piece 100 of the Bourdon spring 19 can also be adjusted radially relative to the watch case 12.

However, this adjustment also varies the position of the other end of the Bourdon spring 19, which is connected to the depth measurement mechanism, and thus also the position of the depth hand 6.

The position of the depth hand 6 is therefore dependent on the position of the end piece 100 of the Bourdon spring 19. If the curvature of the Bourdon spring 19 varies owing to changes in atmospheric pressure, the depth hand 6 moves slightly from its zero position either above or below zero. This error would be retained during a dive. The depth hand can be adjusted to exactly zero directly before a dive by rotating the union nut 106, thus avoiding an erroneous display during the dive.

Present between the flange-like extension 113, the crown bush 65 and the shaft 96 is an annular chamber 114 in which there is arranged a helical spring 115 which surrounds the shaft 96 and is supported with one of its ends on the crown bush 95 and with its other end on a flange-like extension 116 of the shaft 96 and holds the latter bearing against the cover 105 of the union nut.

As a result, the flanks of the internal thread 110 of the hollow cylindrical part of the union nut 106 are always held in one direction bearing against the flanks of the external threads 111 and 112, the result being that no thread play can falsify the accuracy of the display of the depth hand 6.

The free end of the hollow cylindrical part 109 grips the flange-like extension 113 of the crown bush 95 from behind and thus forms in one direction an axial limitation of the screwing movement of the union nut 106. Furthermore, a sealing ring 122 is arranged between this end of the hollow cylindrical part 109 and the crown bush 95.

The adjustment path required for the shaft 96 and the end piece 100 of the Bourdon spring 19 is 0.3 mm in the case of the original of the exemplary embodiment represented in an enlarged fashion, and this produces a hand adjustment corresponding to a water depth of 20 m.

The articulated connection of the shaft 96 to the joint hollow screw 98 eliminates distortions between these two parts during a setting operation and a measuring operation.

In order to ensure that the end piece 100 of the Bourdon spring 19 can be adjusted radially in a fashion moving as easily as possible when adjusting by means of the shaft 96, the end piece is fastened on one end of a pivoting arm 117 whose other end can be pivoted about a pivoting axis 118 arranged firmly on the watch case 12 and extending parallel to the longitudinal axis of the joint hollow screw 98. This permits the end piece 100 of the Bourdon spring 19 to be moved in a largely radial fashion in the watch case 12.

What is claimed is:

1. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of whcih a mechanical depth measurement mechanism (17) of a mechanical display can be driven;
wherein the mechanical depth measurement mechanism (17) has a display shaft (22) which can be rotatably driven by the pressure transducer and carries a depth hand (6) which can sweep over a depth scale 15);
the pressure transducer is an annular spring pressure gauge with an annular Bourdon spring (19) of which one end is fastened on the watch case (12) and is connected to a measuring opening (30) and of which the other end, which can be freely swiveled radially, can drive in a movable fashion the depth measurement mechanism (17) by means of which the pivoting movement of the free end of the Bourdon spring (19) can be converted into a movement which can drive a display shaft (22) rotatably; and
the end of the Bourdon spring (19) is fastened on the watch case (12) via a shaft (96) projecting radially from the watch case (12), it being possible for the shaft (96) to be adjusted in the direction of its longitudinal extent.

2. The watch as claimed in claim 1, wherein the display shaft (22) is arranged coaxially with the hour tube and minute tube, and the depth scale is arranged on the dial.

3. The watch as claimed in claim 2, wherein the scale division of the depth scale (5) corresponds to the scale division of the minute scale (2).

4. The watch as claimed in claim 1, wherein the display shaft (22) projects coaxially through the hour and minute tubes.

5. The watch as claimed in claim 1, wherein the pressure transducer is connected to the environment via a measuring opening.

6. The watch as claimed in claim 1, wherein a measuring opening (30) in the watch case (12) is constructed such that it can be closed manually in order to connect the pressure transducer to the environment.

7. The watch as claimed in claim 6, wherein a closing device of the measuring opening is constructed as a pressure-reducing valve by means of which the measuring opening can be closed upon overshooting of a specific ambient pressure.

8. The watch as claimed in claim 1, wherein the ambient pressure outside the watch case (12) can be applied to the mechanical pressure transducer via an incompressible medium.

9. The watch as claimed in claim 8, wherein the incompressible medium is a liquid.

10. The watch as claimed in claim 9, wherein the liquid is water or oil.

11. The watch as claimed in claim 1, wherein the ambient pressure can be applied to an incompressible medium via a movable wall.

12. The watch as claimed in claim 11, wherein the movable wall is a diaphragm (76).

13. The watch as claimed in claim 11, wherein there is constructed in the watch case (12) a measuring opening (30) which serves for the application of the ambient pressure to a pressure gauge and leads to a chamber (75) which is filled with the incompressible medium and of which one wall is the movable wall to which the ambient pressure can be applied.

14. The watch as claimed in claim 1, wherein the capacity of the free end of the Bourdon spring (19) to swivel radially is limited by stops.

15. The watch as claimed in claim 14, wherein the Bourdon spring (19) is arranged surrounding the movement (16) in the watch case (12).

16. The watch as claimed in claim 14, wherein the Bourdon spring (19) is arranged with play in an annular chamber (18) of the watch case (12), the walls (20, 21) of the annular chamber (18) forming the stops.

17. The watch as claimed in claim 1, wherein the interior of the Bourdon spring (19) is connected to a chamber (75) via the measuring opening (30) and is filled with the incompressible medium.

18. The watch as claimed in claim 17, wherein a movable wall can be subjected to the action of a manually displaceable pusher (78) in a fashion reducing the volume of the chamber (75).

19. The watch as claimed in claim 18, wherein the capacity of the pusher (78) to be displaced in the direction in which the volume of the chamber (75) is increased is limited by a stop (80).

20. The watch as claimed in claim 17, wherein the chamber (75) and/or a pusher (78) are arranged in a crown (74).

21. The watch as claimed in claim 1, wherein the end of the Bourdon spring (19) fastened on the watch case (12) can be adjusted radially.

22. The watch as claimed in claim 1, wherein a non-return hand (7) indicating the maximum depth of a dive can be driven pivotably in the depth direction (35) by the pressure gauge or the depth measurement mechanism (17) or the depth hand (6).

23. The watch as claimed in claim 22, wherein the depth hand (6) has a driver (34) by means of which the depth hand (6) can strike against the non-return hand (7) and the latter can be moved in the depth direction (35).

24. The watch as claimed in claim 22, wherein the non-return hand (7) can be driven pivotably about an axis coaxial with the rotation axis of the depth hand (6).

25. The watch as claimed in claim 24, wherein the non-return hand (7) is arranged on a non-return hand shaft or on a non-return hand tube (23) surrounding the display shaft (22).

26. The watch as claimed in claim 1, wherein a non-return hand (7) is resiliently biased against the depth direction (35) with respect to the depth hand (6).

27. The watch as claimed in claim 26, wherein a biased spiral spring (48) surrounding the display shaft (22) is permanently arranged with its one end on the display shaft (22) and with its other end on a non-return hand shaft or a non-return hand tube (22) or a locking disk (36).

28. The watch as claimed in claim 1, wherein the mechanical depth measurement mechanism (17) is arranged on the bottom side of the watch case (12), which is opposite the dial (1) and can be closed by the openable case bottom (14).

29. The watch as claimed in claim 28, wherein the display shaft (22) projects through a movement (16).

30. The watch as claimed in claim 1 wherein the free end of the Bourdon spring (19) is pivotably connected via an articulated rod mechanism (28) to a lever (26) of a saw segment (25) by means of which a drive pinion (24) of the display shaft (22) can be driven rotatably.

31. The watch as claimed in claim 30, wherein the articulated rod mechanism (28, 28') is pivoted with its one end at the free end of the Bourdon spring (19) and with its other end at the free end of the saw segment lever (26).

32. The watch as claimed in claim 30, wherein the articulated rod mechanism (28') can be set in a fashion varying its length.

33. The watch as claimed in claim 32, wherein the connection of the articulated rod mechanism (28') to the lever 26 of the saw segment is guided displaceably and can be fixed in the longitudinal extent of the articulated rod mechanism (28').

34. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of whcih a mechanical depth measurement mechanism (17) of a mechanical display can be driven;
 wherein a measuring opening (30) in the watch case (12) is constructed such that it can be closed manually in order to connect the pressure transducer to the environment; and the measuring opening (30) can be closed manually by a screwed crown (11).

35. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of which a mechanical depth measurement mechanism (17) of a mechanical display can be driven;
 wherein the pressure transducer is an annular spring pressure gauge with an annular Bourdon spring (19) of which one end is fastened on the watch case (12) and is connected to the measuring opening (30) and of which the other end, which can be freely swiveled radially, can drive in a movable fashion the depth measurement mechanism (17) by means of which the pivoting movement of the free end of the Bourdon spring (19) can be converted into a movement which can drive a display shaft (22) rotatably;
 the end of the Bourdon spring (19) fastened on the watch case (12) can be adjusted radially; and the end of the Bourdon spring (19) is fastened on the watch case (12) via a shaft (96) projecting radially from the watch case (12), it being possible for the shaft (96) to be adjusted in the direction of its longitudinal extent.

36. The watch as claimed in claim 35, wherein the shaft (96) is guided displaceably in a crown bush (95) which is firmly connected to the watch case (12) and is provided with a thread on which there is arranged a union nut (106) on which the free end of the shaft (96) is supported.

37. The watch as claimed in claim 36, wherein the thread is a fine thread.

38. The watch as claimed in claim 35, wherein a spring force is applied to the shaft (96) axially against the union nut (106).

39. The watch as claimed in claim 35, wherein the shaft (96) has an axial bore (102) one of whose ends is connected to the environment and the other of whose ends is connected to the interior of the Bourdon spring (19).

40. The watch as claimed in claim 36, wherein the union nut (106) is constructed in a pot-shaped fashion and has a cover (105) which covers the opening region, directed towards the environment, of the axial bore (102) of the shaft (96), and in which one or more through bores (107) of small cross section are constructed.

41. The watch as claimed in claim 35, wherein the end of the shaft (96) on the Bourdon spring end is mounted with a transverse bore (97) pivotably on a joint hollow screw (98), the axial bore (102) of the shaft (96) opening into an axial bore (101) of the joint hollow screw (98), and the axial bore (101) of the joint hollow screw (98), which is firmly connected to the Bourdon spring (19), opening into the Bourdon spring (19).

42. The watch as claimed in claim 41, wherein the Bourdon spring (19) is fastened in the region of the joint hollow screw (98) on one end of a pivoting arm (117) whose other end can be pivoted about a pivoting axis (118) which is arranged firmly on the watch case (12) and extends parallel to the longitudinal axis of the joint hollow screw (98).

43. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of which a mechanical depth measurement mechanism (17) of a mechanical display can be driven;

wherein the pressure transducer is an annular spring pressure gauge with an annular Bourdon spring (19) of which one end is fastened on the watch case (12) and is connected to the measuring opening (30) and of which the other end, which can be freely swiveled radially, can drive in a movable fashion the depth measurement mechanism (17) by means of which the pivoting movement of the free end of the Bourdon spring (19) can be converted into a movement which can drive a display shaft (22) rotatably;

the free end of the Bourdon spring (19) is pivotably connected via an articulated rod mechanism (28) to a lever (26) of a saw segment (25) by means of which a drive pinion (24) of the display shaft (22) can be driven rotatably;

the articulated rod mechanism (28') can be set in a fashion varying its length; the connection of the articulated rod mechanism (28') to the lever 26 of the saw segment is guided displaceably and can be fixed in the longitudinal extent of the articulated rod mechanism (28'); and the lever 26 of the saw segment has an elongated hole (84) into which there project two guide pins (85) which are arranged on the articulated rod mechanism (28') at a smaller spacing from one another in the longitudinal extent of the articulated rod mechanism (28') than the length of the elongated hole (84), it being possible for a fixing screw (86) to be screwed in a fashion penetrating the elongated hole (84) into a threaded hole in the lever (26) of the saw segment, and to be pressed with its screw head on the lever (26) of the saw segment against the articulated rod mechanism (28').

44. The watch as claimed in claim 43, wherein a pin which is arranged such that it can rotate parallel to the guide pin (85) on the lever (26) of the saw segment and has an eccentric head (88) which projects into a bore in the articulated lever mechanism (28').

45. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of which a mechanical depth measurement mechanism (17) of a mechanical display can be driven;

wherein the pressure transducer is an annular spring pressure gauge with an annular Bourdon spring (19) of which one end is fastened on the watch case (12) and is connected to the measuring opening (30) and of which the other end, which can be freely swiveled radially, can drive in a movable fashion the depth measurement mechanism (17) by means of which the pivoting movement of the free end of the Bourdon spring (19) can be converted into a movement which can drive a display shaft (22) rotatably;

the free end of the Bourdon spring (19) is pivotably connected via an articulated rod mechanism (28) to a lever (26) of a saw segment (25) by means of which a drive pinion (24) of the display shaft (22) can be driven rotatably; and a pivotably arranged spring-loaded resetting saw segment (32) engages in the drive pinion and can be applied in order to move the drive pinion (24) rotatably in the depth direction (35).

46. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of which a mechanical depth measurement mechanism (17) of a mechanical display can be driven;

wherein a non-return hand (7) indicating the maximum depth of a dive can be driven pivotably in the depth direction (35) by the pressure gauge or the depth measurement mechanism (17) or the depth hand (6); and the pivoting movement of the non-return hand (7) can be locked against the depth direction (35) by a releasable latching device.

47. The watch as claimed in claim 46, wherein the pivoting movement of the non-return hand (7) can be locked by a pawl-type lock.

48. The watch as claimed in claim 47, wherein the non-return hand shaft or the non-return hand tube (23) has a locking disk (36) with a row of teeth (37) which are arranged running around radially and in the tooth spaces of which a locking pawl (38) can engage in a locking fashion against the depth direction (35).

49. The watch as claimed in claim 48, wherein the locking disk (36) is constructed on its radially circumferential edge with a row of saw teeth (37) of which the teeth are directed against the direction of rotation of the non-return hand (7) toward depth.

50. The watch as claimed in claim 48, wherein the locking pawl can be pivoted about a pivoting axis (39).

51. The watch as claimed in claim 48, wherein the locking pawl can be acted upon manually in the unlocking direction.

52. The watch as claimed in claim 51, wherein the locking pawl (38) can be acted upon in the unlocking direction by an actuating slide (42) which projects from the watch case (12) with its one end such that it can be acted upon manually, or which can be acted upon manually by a pusher (9).

53. The watch as claimed in claim 52, wherein the unlocking slide (42) is spring-loaded against the direction in which the locking pawl (38) can be acted upon.

54. The watch as claimed in claim 46, wherein in each case a locking pawl (38') is arranged at a spacing one from another in the circumferential direction of a locking disc (36) on each lever arm (93) of a two-arm lever (92) which can be pivoted freely about a pivoting axis (91) parallel to the axis of rotation of the locking disc (36), it being possible, upon rotation of the locking disc (36) in the depth direction (35) for a locking nose (41') of one locking pawl (38') to be moved, sliding along the tooth flank, out of a tooth space (94) of a row of saw teeth (37) and thereby for the two-arm lever (92) to be pivoted in such a way that in the process the locking nose (41') of the other locking pawl (38') can be moved into a tooth space (94) of the row of saw teeth (37).

55. The watch as claimed in claim 54, wherein an actuating slide (42') is displaceably guided approximately radially relative to the axis of rotation of the locking disc (36) and carries a pivoting axis (91) of the two-arm lever (92).

56. A watch, in particular a dive watch, having a movement which is arranged in a watch case and can be used to drive an hour hand via an hour tube and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer to which the ambient pressure outside the watch case (12) can be applied and by means of which a mechanical depth measurement mechanism (17) of a mechanical display can be driven;

wherein a non-return hand (7) indicating the maximum depth of a dive can be driven pivotably in the depth direction (35) by the pressure gauge or the depth measurement mechanism (17) or the depth hand (6); the pivoting movement of the non-return hand (7) can be locked against the depth direction (35) by a releasable latching device; and the pivoting movement of the non-return hand (7) can be locked by a pawl-type lock; and the non-return hand shaft or the non-return hand tube (23) has a locking disk (36) with a row of teeth (37) which are arranged running around radially and in the tooth spaces of which a locking pawl (38) can engage in a locking fashion against the depth direction (35); and the locking pawl (38) can engage in the tooth spaces under resilient biasing.

57. A watch, in particular a dive watch, having a movement which is arranged in a watch case and can be used to drive an hour hand via an hour tube, and a minute hand and, if appropriate, a second hand via a minute tube in a fashion sweeping over a dial, as well as having a pressure detecting device for detecting the ambient pressure outside the watch case and a display for representing the detected pressure values, wherein there is arranged in the watch case (12) a mechanical pressure transducer in which the ambient pressure outside the watch case (12) can be applied and by means of which a mechanical depth measurement mechanism (17) of a mechanical display can be driven, wherein the pressure detecting device is an annular spring pressure gauge with an annular Bourdon spring (19), of which one end is fastened on the watch case (12) and of which the other end, which is freely swiveled radially, to drive in a movable fashion the depth measurement mechanism (17) by means of which a pivoting movement of the free end of the Bourdon spring (19) drives the mechanical display; and the end of the Bourdon spring (19) is fastened on the watch case (12) via a shaft (96) projecting radially from the watch case (12), it being possible for the shaft (96) to be adjusted in the direction of its longitudinal extent.

\* \* \* \* \*